United States Patent
Agiwal et al.

(10) Patent No.: US 9,565,671 B2
(45) Date of Patent: Feb. 7, 2017

(54) METHOD AND APPARATUS OF BEARER GROUPING FOR DATA TRANSMISSION IN A BROADBAND WIRELESS NETWORK

(71) Applicant: Samsung Electronics Co. Ltd., Suwon-si, Gyeonggi-do (KR)

(72) Inventors: Anil Agiwal, Bangalore (IN); Young-Bin Chang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 134 days.

(21) Appl. No.: 13/961,242

(22) Filed: Aug. 7, 2013

(65) Prior Publication Data

US 2014/0044065 A1 Feb. 13, 2014

(30) Foreign Application Priority Data

Aug. 8, 2012 (IN) .............................. 3261/CHE/2012

(51) Int. Cl.
*H04W 72/00* (2009.01)
*H04W 72/04* (2009.01)
*H04W 76/00* (2009.01)
*H04W 76/02* (2009.01)

(52) U.S. Cl.
CPC ....... *H04W 72/0433* (2013.01); *H04W 76/002* (2013.01); *H04W 76/021* (2013.01)

(58) Field of Classification Search
None
See application file for complete search history.

(56) References Cited

U.S. PATENT DOCUMENTS

| 2009/0059835 A1 | 3/2009 | Motegi et al. | |
|---|---|---|---|
| 2009/0239526 A1* | 9/2009 | Zhao | H04W 60/06 455/424 |
| 2010/0093355 A1* | 4/2010 | Voyer | H04W 36/04 455/436 |
| 2010/0220671 A1* | 9/2010 | Guillouard | H04B 7/024 370/329 |
| 2011/0110379 A1* | 5/2011 | Lim | H04W 76/021 370/401 |
| 2011/0300872 A1* | 12/2011 | Lim | H04W 36/18 455/450 |
| 2012/0002583 A1 | 1/2012 | Kong et al. | |
| 2012/0076066 A1 | 3/2012 | Lee | |
| 2012/0140666 A1 | 6/2012 | Takahashi et al. | |

FOREIGN PATENT DOCUMENTS

| EP | 2 001 146 A1 | 12/2008 | |
|---|---|---|---|
| WO | WO 2012024455 A2 * | 2/2012 | .......... H04L 47/215 |
| WO | 2014/148836 A2 | 9/2014 | |

OTHER PUBLICATIONS

Panasonic, Radio bearer grouping for uplink scheduling, Feb. 11-15, 2008, 3GPP TSG RAN WG2#1, pp. 1-3.*

(Continued)

*Primary Examiner* — Hassan Phillips
*Assistant Examiner* — Ayanah George
(74) *Attorney, Agent, or Firm* — Jefferson IP Law, LLP

(57) ABSTRACT

A method for grouping bearers for data transmission by a Base Station (BS) in a wireless communication network are provided. The method includes sending a bearer request to a data gateway, and receiving a bearer response from the data gateway with parameters associated with grouping of the bearers.

28 Claims, 15 Drawing Sheets

(56) References Cited

OTHER PUBLICATIONS

Panasonic, 'Radio bearer grouping for uplink scheduling,' R2-080877, 3GPP TSG RAN WG2#61, Feb. 11, 2008.
Project Planning Committee, Hierarchical Network Study Report, Nov. 9, 2011, pp. 1-32, IEEE 802.16ppc-11/004r2, XP017716095, IEEE-SA, Piscataway, NJ USA.

* cited by examiner

METHOD AND APPARATUS OF BEARER GROUPING FOR DATA TRANSMISSION IN A BROADBAND WIRELESS NETWORK

CROSS-REFERENCE TO RELATED APPLICATION(S)

This application claims the benefit under 35 U.S.C. §119(a) of an Indian patent application filed in the Indian Patent Office on Aug. 8, 2012 and assigned Serial No. 3261/CHE/2012, the entire disclosure of which is hereby incorporated by reference.

TECHNICAL FIELD

The present disclosure relates to broadband wireless network. More particularly, the present disclosure relates to method and apparatus of bearer grouping for data transmission between Base Stations (BSs) and a data gateway in a broadband wireless network wherein multiple BSs group together to serve a mobile station.

BACKGROUND

In the recent years several broadband wireless technologies have been developed to meet the growing number of broadband subscribers and to provide more and better applications and services. The 3rd Generation Partnership Project 2 (3GPP2) has developed Code Division Multiple Access 2000 (CDMA 2000), 1x Evolution Data Optimized (1x EVDO), and Ultra Mobile Broadband (UMB) systems. The 3rd Generation Partnership Project (3GPP) has developed Wideband Code Division Multiple Access (WCDMA), High Speed Packet Access (HSPA), and Long Term Evolution (LTE) systems. The Institute of Electrical and Electronics Engineers has developed Mobile Worldwide Interoperability for Microwave Access (WiMAX) systems. As more people become users of mobile communication systems and more services are provided over these systems, there is an increasing need for a mobile communication system with large capacity, high throughput, lower latency and better reliability.

A broadband wireless network based on millimeter waves, i.e., radio waves with wavelengths in a range of 1 millimeter (mm) to 10 mm, which range corresponds to a radio frequency of 30 Gigahertz (GHz) to 300 GHz, is a candidate for a next generation mobile communication technology, as a vast amount of spectrum is available in the mm wave band. The broadband wireless network based on the millimeter wave includes multiple Base Stations (BSs) that cover a geographic area. In order to ensure good coverage, BSs must be deployed with higher density than related-art macro-cellular BSs. In general, roughly the same site-to-site distance as micro-cell or pico-cell deployment in an urban environment is recommended. The transmission and/or reception in a millimeter wave system are based on narrow beams which suppress interference from neighboring base stations and extend the range of a millimeter wave link. This allows significant overlap of coverage among neighboring base stations. Unlike cellular systems that partition the geographic area into cells, with each cell served by one or a few base stations, the base stations in a millimeter wave system are disposed in a grid with a large number of nodes with which a Mobile Station (MS) can communicate. The base station grid addresses a problem of poor link quality at the cell edge that is inherent in cellular systems, and enables high-quality Equal Grade Of Service (EGOS) regardless of the location of a mobile station.

In order to utilize the fact that MS can detect signal from multiple BSs in broadband wireless network, a virtual cell (or a Cloud Cell) is formed around the MS. A Cloud Cell is a virtual cell including multiple BSs that serve an MS. The BSs in the Cloud Cell communicating with MSs need to perform downlink (DL) transmit (Tx) Beam forming, while the MSs may need to perform DL receive (Rx) Beam forming to receive DL control and data. An MS communicating with a BS in the Cloud Cell may need to perform uplink (UL) Tx Beam forming while the BS will perform UL Rx Beam forming to transmit UL data. One BS in the Cloud Cell is designated as a master for coordination among other BSs in the Cloud Cell. The BSs of the Cloud Cell for an MS are continually changing because of MS mobility. A Cloud Cell is specific to an MS. A BS can be part of multiple Cloud Cells and it may be the master for some Cloud Cells and a slave for other Cloud Cells.

In the traditional communication system wherein an MS communicates with one BS, the downlink BS receives Internet Protocol (IP) packets from a data GateWay (GW) in DL, performs all processing, and transmits physical bursts carrying the processed IP packets to the MS. In the uplink, the BS receives the physical bursts from the MS, performs all processing, and transmits the IP packets to data GW.

In the broadband wireless network, wherein multiple BSs are grouped together to serve an MS and the MS communicates with multiple BSs in a Cloud Cell, all the BSs in the Cloud Cell receive IP packets from a data GW in DL. In the UL, the data GW can receive IP packets from one or multiple BSs in the Cloud Cell. In such a system, a method is used to enable grouping of bearers (or data flows) between the member BSs in the Cloud Cell and the data GW, wherein the grouped bearers across multiple BSs carry data for a service flow of an MS.

SUMMARY

Aspects of the present disclosure are to address at least the above-mentioned problems and/or disadvantages and to provide at least the advantages described below. Accordingly, an aspect of the present disclosure is to provide a method for data transmission between member BSs and a data gateway in a broadband wireless network wherein multiple BSs group together to serve a mobile station.

Another aspect of the present disclosure is to provide a method to group a new bearer with an existing bearer according to parameters associated with the bearers.

In accordance with an aspect of the present disclosure, a method for grouping bearer for data transmission by a Base Station (BS) in a wireless communication network is provided. The method includes sending a bearer request to a data gateway by a Base Station (BS) and receiving a bearer response from the data gateway with parameters associated with grouping of the bearers.

In accordance with another aspect of the present disclosure, a Base Station (BS) for grouping bearer for data transmission in a wireless communication network is provided. The Base Station (BS) includes a transceiver for transmitting/receiving data to or from a data gateway and a controller for controlling operations of sending a bearer request for grouping bearers to a data gateway, and receiving a bearer response from the data gateway with parameters associated with grouping of the bearers.

In accordance with yet another aspect of the present disclosure, a method for grouping bearer for data transmission by a data gateway in a wireless communication network is provided. The method includes receiving a bearer request including at least one parameter associated with grouping of the bearers from a Base Station (BS) and grouping the bearers based on said at least one parameter in said bearer request.

In accordance with still another aspect of the present disclosure, A data gateway for grouping bearer for data transmission in a wireless communication network is provided. The data gateway includes a transceiver for transmitting/receiving data to or from a Base Station (BS) and a controller for controlling operations of receiving a bearer request including at least one parameter associated with grouping of the bearers from the BS, and grouping the bearers based on said at least one parameter in said bearer request.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
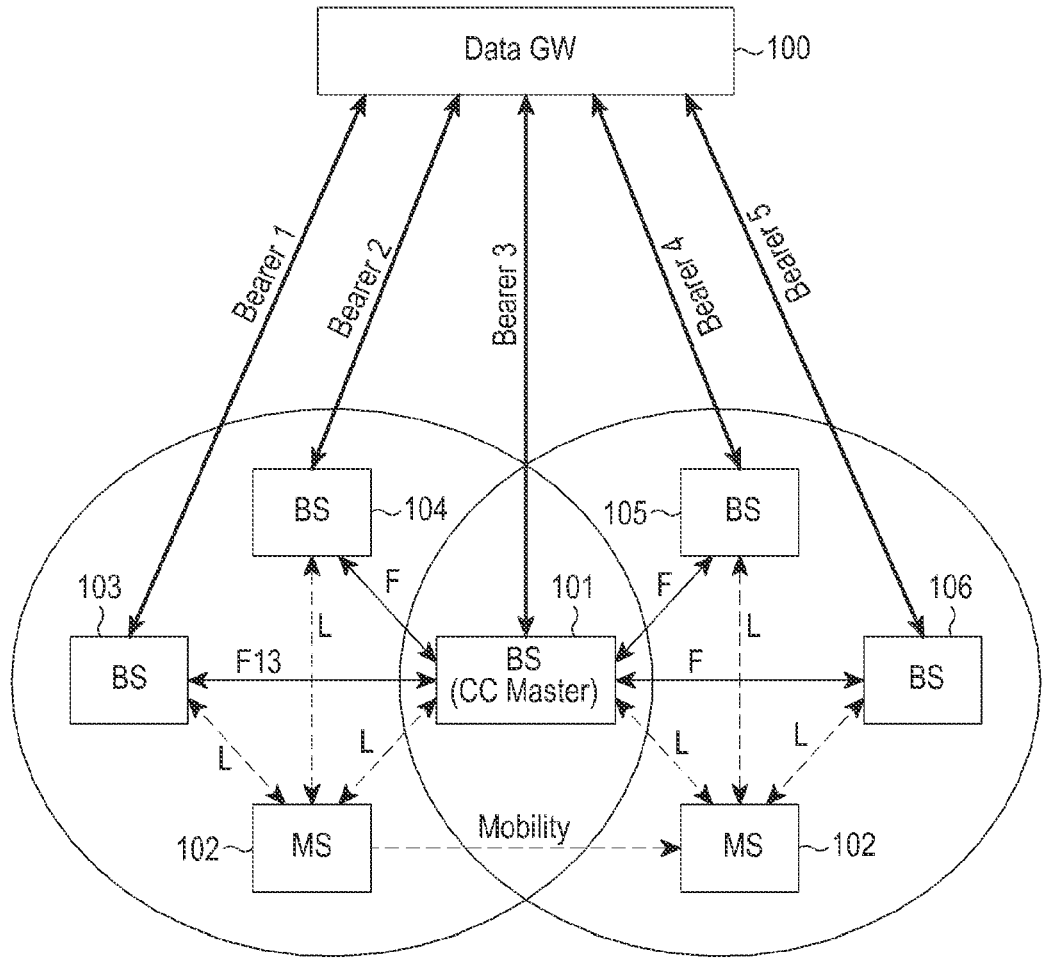
FIG. 1 illustrates a general architecture for network connectivity between a data gateway and a mobile station, according to an exemplary embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

FIGS. 1 through 11, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

The embodiments disclosed herein provide a method and system of bearer grouping for data transmission between Base Stations (BSs) and a data gateway (GW) in a broadband wireless network, where multiple base stations are grouped together to serve a mobile station. Multiple base stations grouped together to serve the mobile station are referred to as a Cloud Cell (CC). One of the BSs in the Cloud Cell acts as a master base station, and the remaining base stations act as slave base stations.

All the base stations in the Cloud Cell (including the master base station or Cloud Cell Master and slave base stations) are connected to the data gateway. Further, the data gateway is connected to an Internet Protocol (IP) network for receiving and transmitting IP packets associated with a service flow of a Mobile Station (MS) in the downlink (DL) and uplink (UL) directions respectively. In the downlink direction, a data gateway multicasts IP packets to BSs in a Cloud Cell. The Cloud Cell Master may also use slave base stations to transmit the received packets from the data gateway to the MS on the link between the mobile station and a slave base station. The Media Access Control (MAC) layer logical connection is used to transmit data from a BS to the MS on a wireless link between the mobile station and the base station. The MAC layer logical connections are established between the MS and the Cloud Cell. These service flows and MAC layer logical connections are not between the MS and individual BSs in the Cloud Cell. The MS and the BSs in the Cloud Cell use a same Flow Identifier (FID) to identify a MAC flow, irrespective of the MS-BS wireless link used for transmission and reception. The Cloud Cell Master (CC Master) BS generates the Medium Access Control Protocol Data Units (MAC PDUs) from the received IP packets, and transmits the MAC PDUs to the MS on the link between the MS and the CC Master. The Cloud Cell Master may also use slave BSs to transmit the received packets from the data gateway to the MS on the link between the MS and a slave BSs. The slave BS (when directed by Cloud Cell Master) generates the MAC PDUs from the received IP packets and transmits the MAC PDUs to the MS. The CC Master coordinates with slave BSs to determine which IP packets received from the data gateway are transmitted by which BSs. The link between the Cloud Cell Master and slave BSs in the Cloud Cell is typically used to carry control information in the downlink direction.

The Medium Access Control and Physical (MAC & PHY) layer processing for data transmission is performed by a particular BS in the Cloud Cell which transmits to the MS in the downlink direction.

In the uplink direction, one or more base stations in the Cloud Cell receive MAC PDUs from the mobile station. The slave base stations transmit the received IP packets in un-fragmented Medium Access Control System Data Units (MAC SDUs) in the received MAC PDUs from the mobile station to the data gateway. The MAC PDUs carrying fragmented MAC SDUs are sent by the slave BSs to the Cloud Cell Master. The Cloud Cell Master transmits the IP packets received in un-fragmented or fragmented MAC SDUs to the data gateway. The entire MAC processing is performed by the Cloud Cell Master if the CC Master receives the physical bursts from the MS directly. The entire MAC processing is performed by a slave BS for unfragmented MAC SDUs received in physical bursts received by the slave BS from the MS. The MAC processing is performed by the slave BS and Cloud Cell Master for fragmented MAC SDUs received in the physical bursts received by the slave BS from the MS.

In an exemplary embodiment, the security context in the Cloud Cell may be maintained at each BS or in the data gateway. Accordingly, the data gateway or BSs in a Cloud Cell perform the security processing in the downlink and uplink directions.

Referring now to FIGS. 1 through 11, where similar reference characters denote corresponding features consistently throughout the figures, there are shown various embodiments of the present disclosure.

FIG. 1 illustrates a general architecture for network connectivity between a data gateway, BSs, and a mobile station, according to an exemplary embodiment of the present disclosure. As depicted in FIG. 1, the architecture for network connectivity includes a data gateway 100, a master base station 101 which acts as a Cloud Cell Master (CC Master), an MS 102, BS 103, BS 104, BS 105, and BS 106. MS 102 is shown with mobility, moving from a Cloud Cell with BSs 101, 103, and 104 to a Cloud Cell with BSs 101, 105, and 106. The Cloud Cell Master 101 acts as a master base station in the Cloud Cell. Data gateway 100 multicasts IP packets for the Cloud Cell corresponding to the mobile station 102 in the downlink direction. The data gateway 100 multicasts IP packets on links between the Data GW 100 and various BSs. The IP packets are transmitted on these links using logical connections, also called as bearers, for the Cloud Cell. These bearers are specific to a service flow of the MS 102, wherein a service flow is characterized by a set of Quality of Service (QoS) parameters. Further, the data gateway 100 uses different bearers (Bearers 1 to 5, depicted in FIG. 1) to multicast IP packets to different BSs (including the CC Master base station BS 101) in the Cloud Cell. The Cloud Cell Master 101 generates the MAC PDUs from received IP packets and transmits the MAC PDUs to the MS 102 on the link between MS 102 and Cloud Cell Master 101 in the DL direction. In FIG. 1, 'F' indicates a front haul link that connects BSs, and 'L' indicates a wireless link between BSs and the MS 102.

BS 103, BS 104, MS 102, and Cloud Cell Master 101, form a Cloud Cell. BS 105, BS 106, MS 102, and Cloud Cell Master 101 form another Cloud Cell. Here, the Cloud Cell Master 101 acts as common entity that serves both the Cloud Cells as shown in FIG. 1. Further, the Cloud Cell Master 101 monitors the MS 102 depending on the mobility of the MS 102. For example, at a first time 't0', the MS 102 may be in the first Cloud Cell, and at a second time 't1', the MS 102 may be moving to the second Cloud Cell, as shown in FIG. 1. In an embodiment, the mobile station 102 may be a mobile phone, Personal Digital Assistant (PDA), tablet computer, laptop computer, etc.

Figure 2:
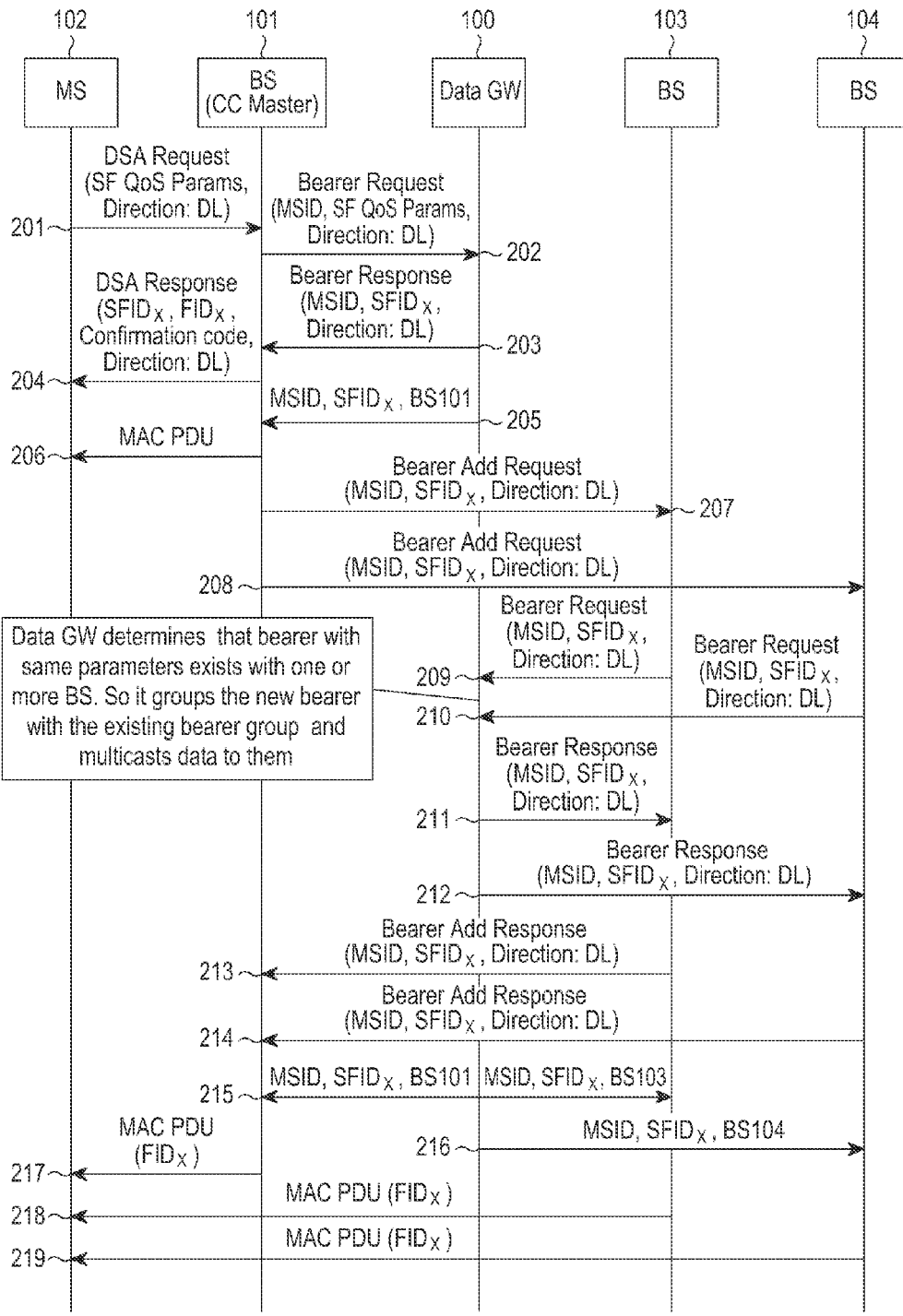
FIG. 2 illustrates a sequence diagram for grouping of downlink bearers across base stations when a new service flow is created, according to an exemplary embodiment of the present disclosure.

FIG. 2 illustrates a sequence diagram for grouping of downlink bearers across base stations when a new service flow is created, according to an exemplary embodiment of the present disclosure. This method provides multicasting establishment without the data gateway being aware of the Cloud Cell and Cloud Cell Master. Consider an MS 102 being served by a Cloud Cell consisting of three BSs, namely BS 101, BS 104, and BS 103. The base station BS 101 acts as a Cloud Cell Master. At operation 201, the MS 102 sends a Dynamic System Analysis (DSA) request to Cloud Cell Master 101. The DSA request comprises service flow quality of service parameters (SF QoS) and the direction which indicates DL. At operation 202, the Cloud Cell Master 101 sends a bearer request to the data gateway 100 for establishing a bearer between Cloud Cell Master 101 and data gateway 100. The bearer is a logical connection between a BS and data gateway for carrying the IP packets. The bearer request comprises a Mobile Station Identification number (MSID), SF QoS, and the direction as downlink. At operation 203, the data gateway 100 receives the bearer request and sends a bearer response to the Cloud Cell Master 101. The bearer response from the data gateway 100 comprises multiple parameters such as MSID, Service Flow Identification number ($SFID_X$) and the direction as DL. $SFID_X$ is the Service Flow ID for the service that the MS 102 has requested. Each bearer may have different Quality of Service (QoS) parameters. The bearer corresponds to a specific service flow of an MS as identified by $SFID_X$ and MSID. The data gateway uses $SFID_X$, MSID, BS identity, and direction of service flow to uniquely identify the bearer.

Once the bearer is established between the data gateway 100 and Cloud Cell Master 101, at operation 204, the Cloud Cell Master 101 sends a DSA response to MS 102. This response comprises $SFID_X$, $FID_X$, confirmation code, and the direction as downlink. $FID_X$ is the ID of the logical connection between MS 102 and Cloud Cell Master 101 associated with established service flow. $FID_X$ is used by all the base stations in the Cloud Cell for communicating with MS 102 for a service flow identified by SFIDx. The same MS and same BS may have multiple connections and the connections are identified by $FID_X$. This $FID_X$ is associated with a particular $SFID_X$ and may be specific to the MS 102. At operation 205, the data gateway 100 sends the IP packets (if any) to the Cloud Cell Master 101 once the bearer is established. The IP packets are sent on bearer identified by MSID, $SFID_X$ and the identifier of Cloud Cell Master 101. At operation 206, the Cloud Cell Master 101 receives the IP packets from data gateway 100 and makes MAC PDUs and sends those IP packets to MS 102 on the connection between MS 102 and Cloud Cell Master 101. The Cloud Cell Master 101 receives the IP packets from data gateway 100 and may store them for transmitting via other slave BSs.

In order to establish a bearer with the other the base stations in the Cloud Cell, namely BS 103 and BS 104, at operation 207, the Cloud Cell Master 101 sends a bearer add request to BS 103 with parameters such as MSID, $SFID_X$, and the direction as downlink. At operation 208, the Cloud Cell Master 101 also sends a bearer add request to BS 104 within the Cloud Cell with same parameters. In response to the bearer request, at operation 209, BS 103 sends the same bearer request with the same parameters to the data gateway 100. At operation 210, BS 104 also sends the same bearer request to data gateway 100 with same parameters for establishing a bearer.

The data gateway 100 determines that a bearer with the same parameters exists with one or more BSs. These same parameters include MSID, $SFID_X$, and the direction as DL. Depending on the same parameters of the bearers, the data gateway groups the new bearer with the existing bearer group and multicasts data to all the bearers within the group.

The data gateway 100 confirms the bearer requests from BS 103 and BS 104 by sending bearer responses at operations 211 and 212, respectively. Further, these slave base stations, namely BS 103 and BS 104, send bearer add responses at operations 213 and 214, respectively, to the Cloud Cell Master 101.

At operations 215 and 216, the data gateway 100 sends the IP packets to the bearer group associated with the MSID and $SFID_X$. The same IP packets are sent on bearers identified by the parameter sets (MSID, $SFID_X$, BS 101), (MSID, $SFID_X$, BS 103), and (MSID, $SFID_X$, BS 104). It is noted that operation 216 occurs concurrently with operation 215, and is depicted separately in FIG. 2 only for visual clarity.

Once the bearers are established between each of the base stations in the Cloud Cell and data gateway 100, the base stations BS 101, BS 103, BS 104 are used to transmit the IP packets to the MS 102. The slave base stations BS 103 and BS 104, as and when directed by the master base station in the Cloud Cell BS 101, send the IP packets to the MS 102 by making MAC PDUs as illustrated at operations 217 to 219. In an embodiment, the interaction between Cloud Cell Master, slave BSs 103 and 104, and data gateway 100 as illustrated in FIG. 2 is also valid for a case wherein service creation is initiated by a BS instead of by MS 102.

Figure 3:
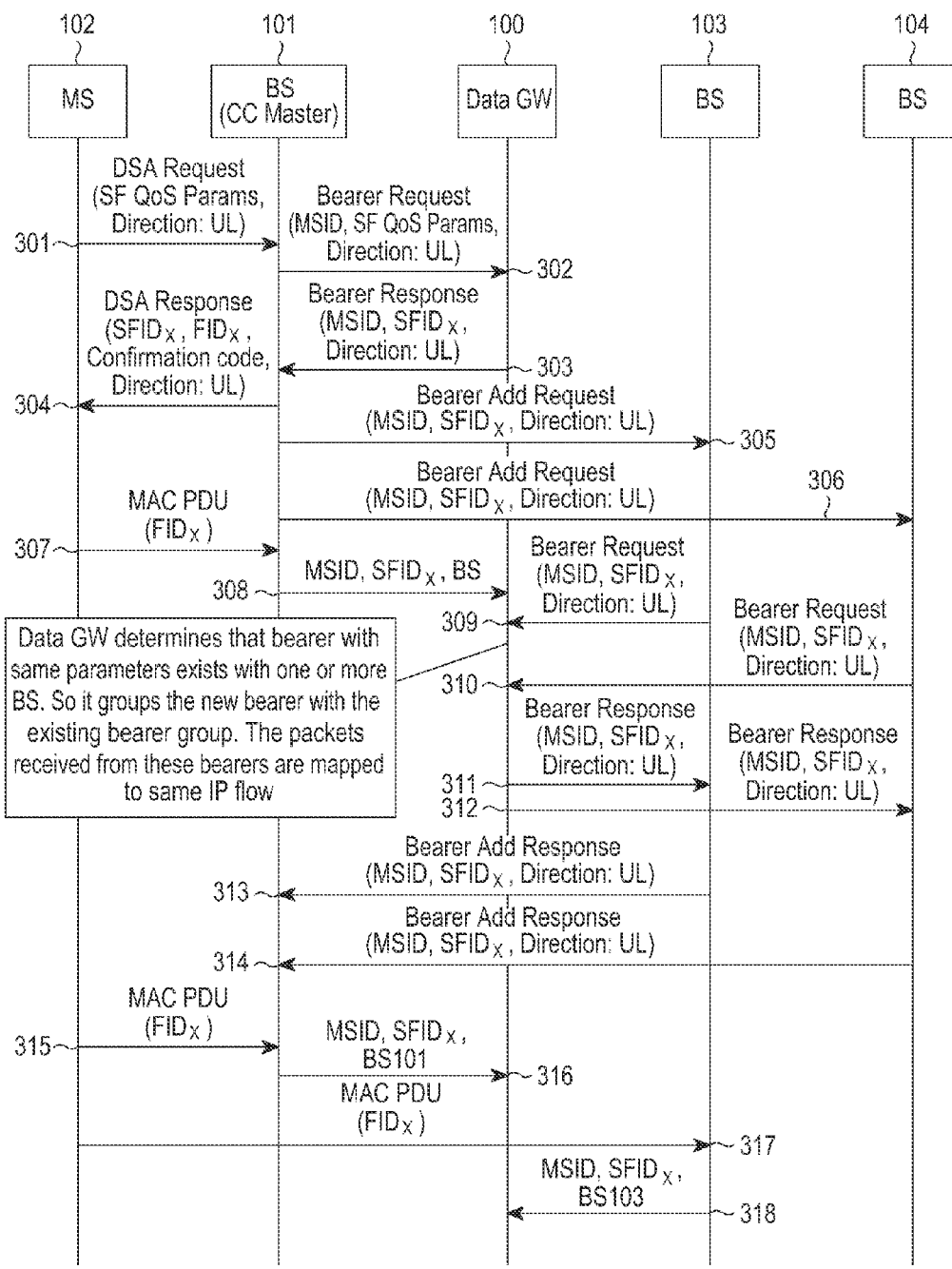
FIG. 3 illustrates a sequence diagram for grouping of uplink bearers across base stations when a new a service flow is created, according to an exemplary embodiment of the present disclosure.

FIG. 3 illustrates a sequence diagram for grouping of uplink bearers across base stations when a new service flow is created, according to embodiments as disclosed herein. This provides association of multiple bearers between BSs and a Data Gateway in the uplink to a single IP flow for an MS when a new service is added in the Cloud Cell without the Data Gateway being aware of the Cloud Cell and Cloud Cell Master.

At operation 301, the MS 102 sends the DSA request to Cloud Cell Master 101. The DSA request includes SF QoS parameters and the direction which indicates UL. At operation 302, the Cloud Cell Master 101 sends a bearer request to the data gateway 100 for establishing a bearer between Cloud Cell Master 101 and data gateway 100. The bearer is a logical connection between a BS and the data gateway for carrying the IP packets in uplink from MS 102. The bearer request comprises an MSID, SF QoS, and the direction as uplink. At operation 303, the data gateway 100 receives the bearer request and sends a bearer response to the Cloud Cell Master 101. The bearer response from the data gateway 100 includes the MSID, $SFID_X$, and the direction as UL. $SFID_X$ is the service flow ID for the service that the MS 102 has requested. The bearer corresponds to a specific service flow of an MS as identified by SFIDx and MSID. The data gateway 100 uses $SFID_X$, MSID, BS identity, and direction of service flow to uniquely identify the bearer.

Once the bearer is established between the data gateway 100 and Cloud Cell Master 101, at operation 304, the Cloud Cell Master 101 sends a DSA response to MS 102. This response includes $SFID_X$, $FID_X$, confirmation code, and the direction as uplink. $FID_X$ is the ID of the logical connection between MS 102 and Cloud Cell Master 101 associated with established service flow. The MS 102 and a particular base station in the Cloud Cell may have multiple connections and the connections are identified by $FID_X$. This $FID_X$ is associated with a particular $SFID_X$ and may be specific to the MS 102.

At operation 305, Cloud Cell Master 101 sends a bearer add request to BS 103. This bearer add request includes MSID, $SFID_X$, and the direction as uplink. At operation 306, the Cloud Cell Master 101 also sends a bearer add request to BS 104. At operation 307, the MS 102 sends MAC PDUs to the Cloud Cell Master 101 using $FID_X$, and, at operation 308, the Cloud Cell Master 101 sends the IP packets received in the MAC PDUs to the data gateway 100 on the bearer identified by MSID, $SFID_x$ and BS.

At operation 309, the base station BS 103 sends a bearer request to data gateway 100. This request includes parameters MSID, $SFID_X$, and direction as uplink. At operation 310, the base station BS 104 also sends a bearer request to data gateway 100. In response to the bearer requests from BS 103 and BS 104, the data gateway 100 sends bearer responses which include MSID, SFID$_X$, and direction as uplink as shown at operations 311 and 312.

The data gateway 100 determines that a bearer with the same parameters exists with one or more BS. These same parameters include MSID, SFID$_X$, and direction as UL. According to the same parameters of the bearers, the data gateway 100 groups the new bearer with the existing bearer group and the packets received from these bearers are mapped to the same IP flow.

At operation 313, the Cloud Cell Master receives a bearer add response from BS 103. This response includes MSID, SFID$_X$, and the direction as uplink. At operation 314, the Cloud Cell Master also receives the bearer add response from BS 104. Once the bearers are established between the data gateway 100 and the base stations, at operation 315, the mobile station 102 transmits a MAC PDU to Cloud Cell Master 101 using FID$_X$. At operation 316, the Cloud Cell Master 101 sends MAC PDU to the data gateway 100. In the same way, at operation 317, MS 102 transmits MAC PDUs to BS 103, and, at operation 318, the BS 103 sends the MAC PDU to data gateway 100. The IP packets received in the MAC PDUs carrying un-fragmented MAC SDUs by BS 103 and BS 104 from MS are directly sent to data gateway 100. The fragmented MAC SDUs received by BS 103 and BS 104 are sent to Cloud Cell Master 101. The Cloud Cell Master 101 will reassemble the fragmented MAC SDUs and transmit the received IP packets to the data gateway 100. In this way, the uplink packets are routed to the data gateway 100 using base stations in the Cloud Cell. In an embodiment, the interaction between Cloud Cell Master, slave BSs, and data gateway 100 as illustrated in FIG. 3 is also valid for the case wherein service flow creation is initiated by a BS instead of by MS 102.

Figure 4A:
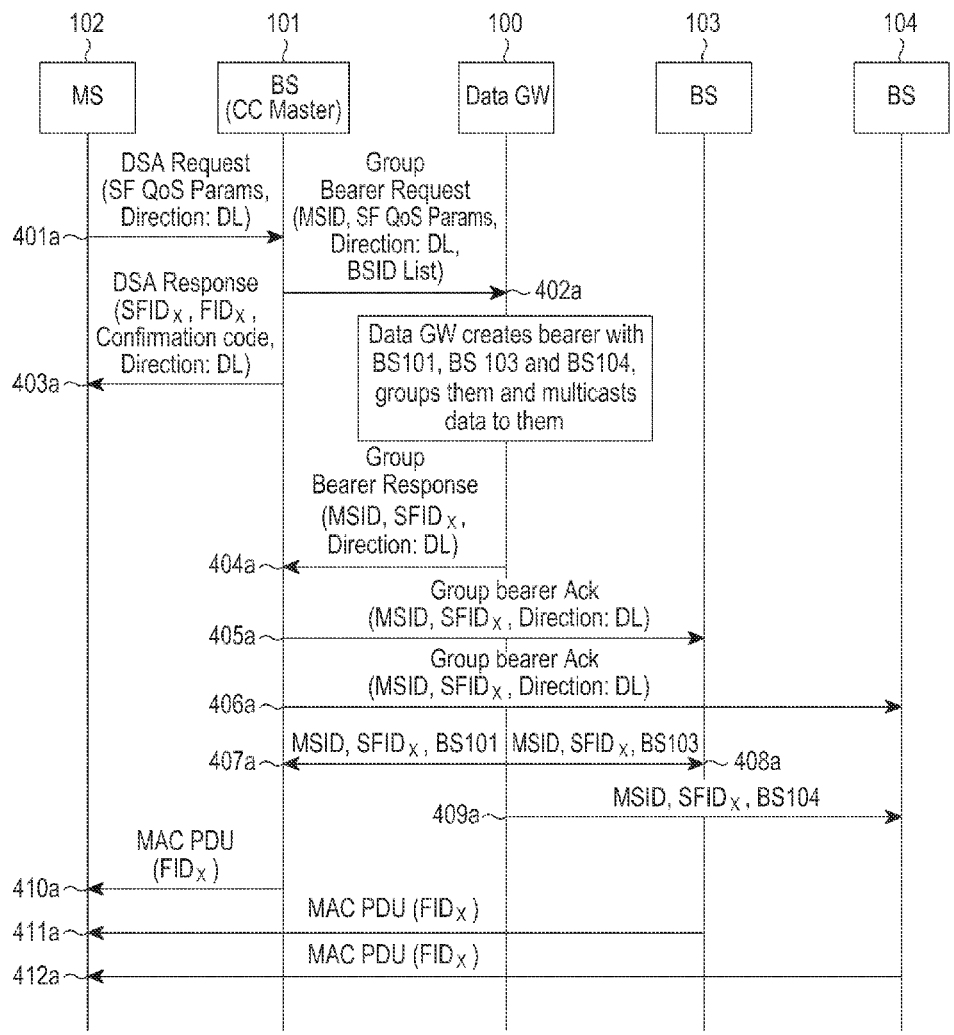
FIG. 4A illustrates a sequence diagram for grouping of downlink bearers across base stations when a new service flow is created, according to an exemplary embodiment of the present disclosure.

FIG. 4A illustrates a sequence diagram for grouping of downlink bearers across base stations when a new service flow is created, according to embodiments as disclosed herein. At operation 401a, the MS 102 sends a DSA request to Cloud Cell Master 101. The DSA request comprises SF QoS parameters and the direction which indicates DL. At operation 402a, the Cloud Cell Master 101 sends a group bearer request to the data gateway 100 for establishing a bearer between BSs in the Cloud Cell and data gateway 100. The bearer is a logical connection between a BS and data gateway 100 for carrying the IP packets. The group bearer request includes an MSID, SF QoS, direction as downlink, and Base Station ID (BSID) list. The BSID list includes the list of base stations in the Cloud Cell serving the MS 102. The BSID list may include all BSs in the Cloud Cell. In this case BSID list includes BS 101 (CC Master), BS 103, and BS 104. The BSID list indicates the data gateway 100 that the bearer needs to be established with these base stations for a service. The data gateway 100 receives the group bearer request and creates a bearer with BS 103 and BS 104, and groups and multicasts data to both bearers. At operation 403a, the Cloud Cell Master 101 sends a DSA response to MS 102. This DSA response includes SFID$_X$, FID$_X$, confirmation code, and direction as DL.

The data gateway 100 receives the group bearer request and, at operation 404a, sends a group bearer response to the Cloud Cell Master 101. The group bearer response from the data gateway 100 includes the MSID, SFID$_X$, and the direction as DL. SFID$_X$ is the service flow ID for the service that the MS 102 has requested. At operation 405a, the Cloud Cell Master 101 sends a group bearer Acknowledgment (Ack) with MSID, SFID$_X$ and direction as DL to BS 103. At operation 406a, the Cloud Cell Master 101 also sends a group bearer acknowledgement (Ack) with the same parameters to BS 104.

At operation 407a, the data gateway 100 sends IP packets on a bearer identified by MSID, SFID$_X$, and BS 101 to Cloud Cell Master 101. At operation 408a, the data gateway 100 also sends IP packets on a bearer identified by MSID, SFID$_X$, and BS 103 to BS 103. At operation 409a, the data gateway 100 also sends IP packets on a bearer identified by MSID, SFID$_X$, and BS 104 to BS 104. The IP packets 407a, 408a and 409a are same. Operations 407a, 408a, and 409a occur concurrently and are depicted separately in FIG. 4A only for visual clarity.

The base stations can now send the IP packets to MS 102 using FID$_X$. At operation 410a, the Cloud Cell Master sends MAC PDU to MS 102. In the same way, the base stations BS 103 and BS 104 can also send the MAC PDU to MS 102 as shown at operations t411a and 412a, respectively, as and when directed by the Cloud Cell Master 101. In an embodiment, the interaction between Cloud Cell Master, slave BSs, and data gateway 100 as illustrated in FIG. 4A is also valid for the case wherein service flow creation is initiated by a BS instead of by MS 102.

Figure 4B:
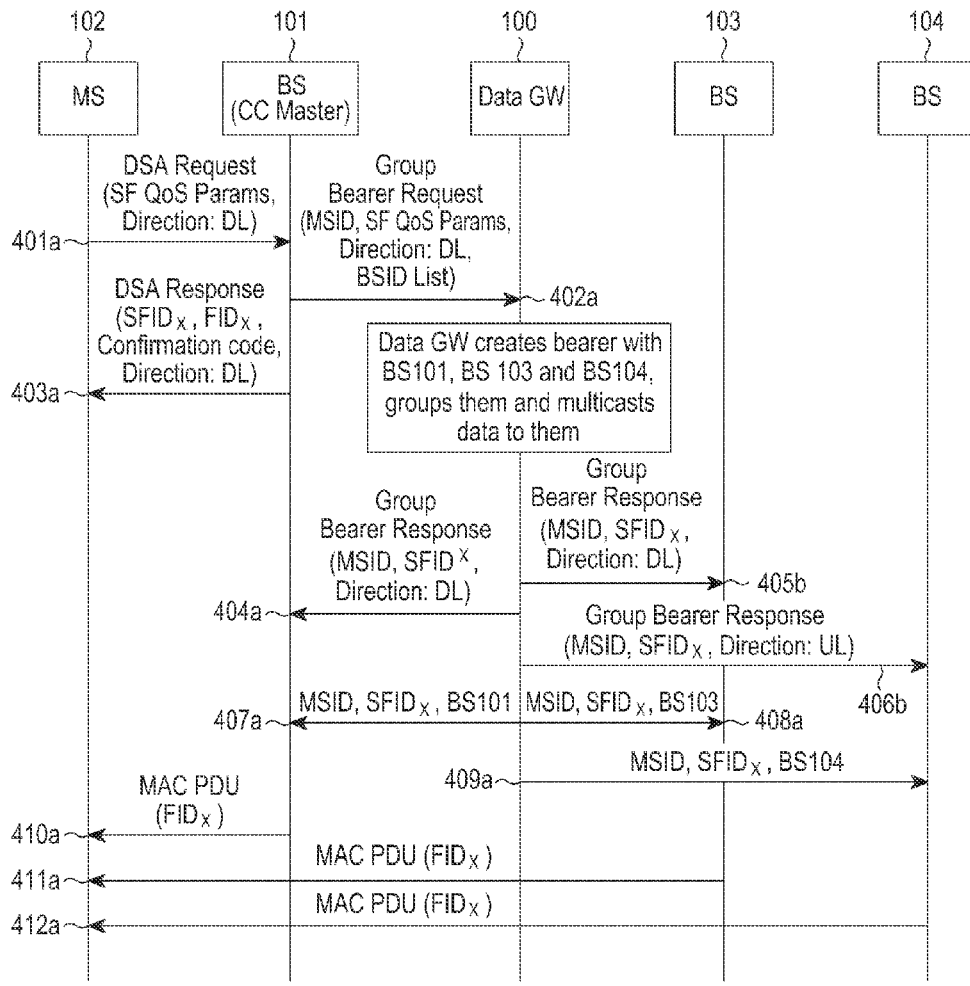
FIG. 4B illustrates a sequence diagram for grouping of downlink bearers across base stations when a new service flow is created, according to an exemplary embodiment of the present disclosure.

FIG. 4B illustrates a sequence diagram for grouping of downlink bearers across base stations when a new service flow is created, according to an alternate embodiment as disclosed herein. At operation 401A, the MS 102 sends the DSA request to Cloud Cell Master 101. The DSA request includes SF QoS parameters and the direction which indicates DL. At operation 402a, the Cloud Cell Master 101 sends a group bearer request to the data gateway 100 for establishing a bearer between BSs in the Cloud Cell and data gateway 100. The bearer is a logical connection between a BS and data gateway 100 for carrying the IP packets in uplink and downlink. The group bearer request includes an MSID, SF QoS, direction as downlink, and BSID list. This group bearer helps in transmitting the packets from base stations to data gateway 100 in both uplink and downlink directions.

The data gateway 100 receives the group bearer request and creates bearers with BS 103 and BS 104, and groups and multicasts data to both bearers. At operation 403a, the Cloud Cell Master 101 sends a DSA response to MS 102. This DSA response includes SFID$_X$, FID$_X$, confirmation code, and direction as DL.

The data gateway 100 receives the group bearer request and, at operation 404a, sends a group bearer response to the Cloud Cell Master 101. The group bearer response from the data gateway 100 includes the MSID, SFID$_X$, and the direction as DL. SFID$_X$ is the service flow ID for the service that the MS 102 has requested. It is noted that operations 401a-404a are the same as described with respect to FIG. 4A. The data gateway 100 also sends a group bearer response to BS 103 and BS 104 as shown at operations 405b and 406b, respectively.

At operation 407a, the data gateway 100 sends IP packets on a bearer identified by MSID, SFID$_X$, and BS 101 to Cloud Cell Master 101. At operation 408a, the data gateway 100 also sends IP packets on a bearer identified by MSID, SFID$_X$, and BS 103 to BS 103. At operation 409a, the data gateway 100 also sends IP packets on a bearer identified by MSID, SFID$_X$, and BS 104 to BS 104. The IP packets of operations 407a, 408a and 409a are same as each other.

The base stations can now send the IP packets to MS 102 using FID$_X$. At operation 410a, the Cloud Cell Master sends MAC PDU to MS 102. In the same way, the base stations BS 103 and BS 104 can also send the MAC PDU to MS 102 as shown at operations 411a and 412a, respectively, as and when directed by the Cloud Cell Master 101. In an embodiment, the interaction between Cloud Cell Master 101, slave BSs, and data gateway 100 as illustrated in FIG. 4B is also valid for the case wherein service flow creation is initiated by a BS instead of by MS 102. It is noted that operations 407a-412a of FIG. 4B are the same as described with respect to FIG. 4A.

Figure 5A:
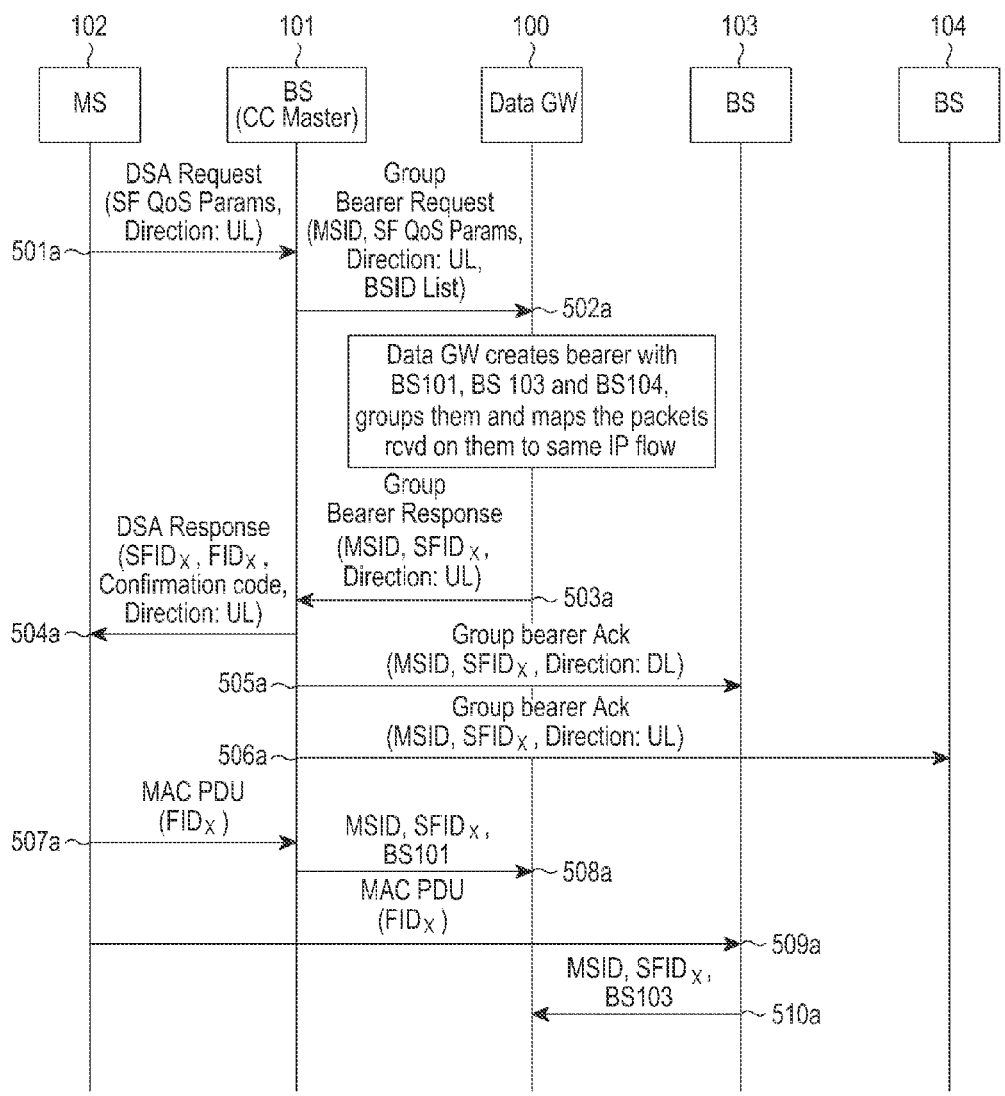
FIG. 5A illustrates a sequence diagram for grouping of uplink bearers across base stations when a new service flow is created, according to an exemplary embodiment of the present disclosure.

FIG. 5A illustrates a sequence diagram for grouping of uplink bearers across base stations when a new service flow is created, according to embodiments as disclosed herein. At operation 501a, the MS 102 sends a DSA request to Cloud Cell Master 101. The DSA request includes SF QoS parameters and the direction which indicates UL. At operation 502a, the Cloud Cell Master 101 sends a group bearer request to the data gateway 100 for establishing a bearer between BSs in the Cloud Cell and data gateway 100. The bearer is a logical connection between a BS and data gateway 100 for carrying the IP packets. The group bearer request includes an MSID, SF QoS, direction as uplink, and BSID list. The BSID list includes the list of base stations in the Cloud Cell serving an MS. The BSID list may include all BSs in the Cloud Cell.

The data gateway 100 receives the group bearer request and creates bearers with BS 101, BS 103, and BS 104, and groups the bearers. The packets received from these bearers are mapped to the same IP flow. At operation 504a, the Cloud Cell Master 101 sends a DSA response to MS 102. This DSA response includes SFID$_X$, FID$_X$, confirmation code, and direction as UL.

The data gateway 100 receives the group bearer request and, at operation 503a, sends a group bearer response to the Cloud Cell Master 101. The group bearer response from the data gateway 100 includes the MSID, SFID$_X$, and the direction as UL. SFID$_X$ is the service flow ID for the service that the MS 102 has requested. At operation 505a, the Cloud Cell Master 101 sends a group bearer Ack with MSID, SFID$_X$ and direction as UL to BS 103. At operation 506a, the Cloud Cell Master 101 also sends a group bearer acknowledgement (Ack) with the same parameters as at operation 505a to BS 104. It is noted that operations 505a and 506a occur concurrently, but are depicted separately in FIG. 5A for visual clarity.

At operation 507a, the MS 102 sends MAC PDU using FID$_X$ to Cloud Cell Master 101 in uplink. At operation 508a, the Cloud Cell Master sends the IP packets received in the MAC PDU to the data gateway 100 on the bearer identified by MSID, SFIDx, and BS 101. In the same way, at operation 509a, the MS 102 also sends MAC PDU using FID$_X$ to BS 103. At operation 510a, the base station 103 sends IP packets received in the MAC PDU to the data gateway 100 on the bearer identified by MSID, SFIDx, and BS 103.

Figure 5B:
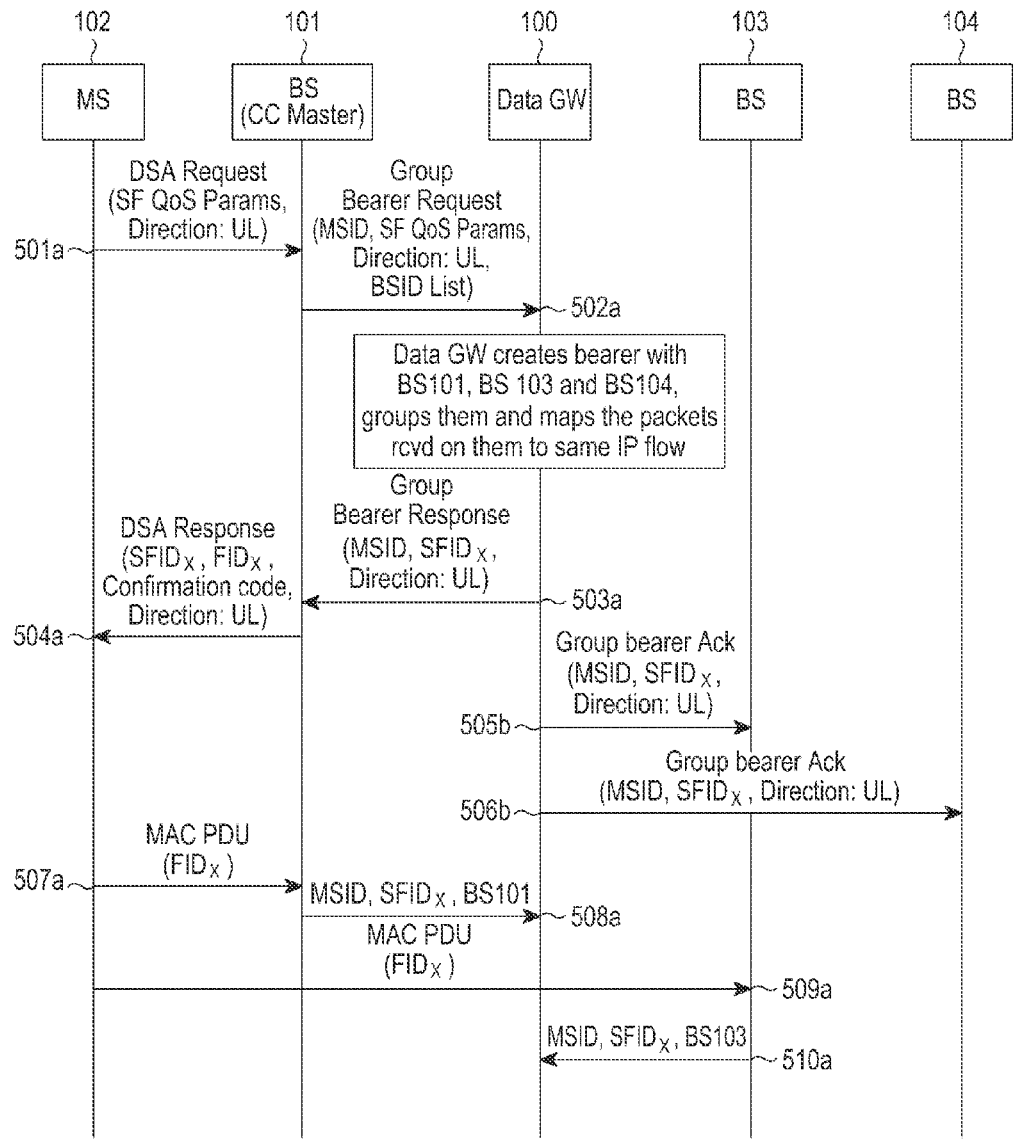
FIG. 5B illustrates a sequence diagram for grouping of uplink bearers when a new service flow is created, according to an exemplary embodiment of the present disclosure.

FIG. 5B illustrates a sequence diagram for grouping of uplink bearers when a new service flow is created, according to an alternated embodiment as disclosed herein. At operation 501a, the MS 102 sends the DSA request to Cloud Cell Master 101. The DSA request comprises SF QoS parameters and the direction which indicates UL. At operation 502a, the Cloud Cell Master 101 sends a group bearer request to the data gateway 100 for establishing a bearer between BSs in the Cloud Cell and data gateway 100. The bearer is a logical connection between a BS and data gateway 100. The group bearer request includes an MSID, SF QoS, direction as uplink, and BSID list. The BSID list includes the list of base stations in the Cloud Cell serving the MS 102. BSID list may include all BSs in the Cloud Cell.

The data gateway 100 receives the group bearer request and creates bearers with BS 103 and BS 104 and groups the bearers. The packets received from these bearers are mapped to the same IP flow. At operation 504a, the Cloud Cell Master 101 sends a DSA response to MS 102. This DSA response includes SFID$_X$, FID$_X$, confirmation code, and direction as UL.

The data gateway 100 receives the group bearer request and, at operation 503a, sends a group bearer response to the Cloud Cell Master 101. The bearer response from the data gateway 100 comprises the MSID, SFID$_X$, and the direction as UL. SFID$_X$ is the service flow ID for the service that the MS 102 has requested. It is noted that operations 501a-504a are the same as described above with respect to FIG. 5A. At operation 505b, the data gateway 100 sends a group bearer Ack with MSID, SFID$_X$, and direction as UL to BS 103. At operation 506b, the data gateway also sends a group bearer Ack with the same parameters as at operation 505b to BS 104.

At operation 507a, the MS 102 sends MAC PDU using FID$_X$ to Cloud Cell Master 101 for uplink of IP packets. At operation 508a, the Cloud Cell Master 101 sends the IP packets received in the MAC PDU on the bearer identified by MSID, SFIDx, and BS 101. In the same way, at operation 509a, the MS 102 also sends MAC PDU using FID$_X$ to BS 103. At operation 510a, the base station 103 sends IP packets received in MAC PDU to the data gateway 100 on the bearer identified by MSID, SFIDx, and BS 103. It is noted that operations 507a-510a are the same as described above with respect to FIG. 5A. In an embodiment, the interaction between Cloud Cell Master, slave BSs, and data gateway 100 as illustrated in FIGS. 5A and 5B is also valid for the case wherein service flow creation is initiated by BS instead of MS.

Figure 6:
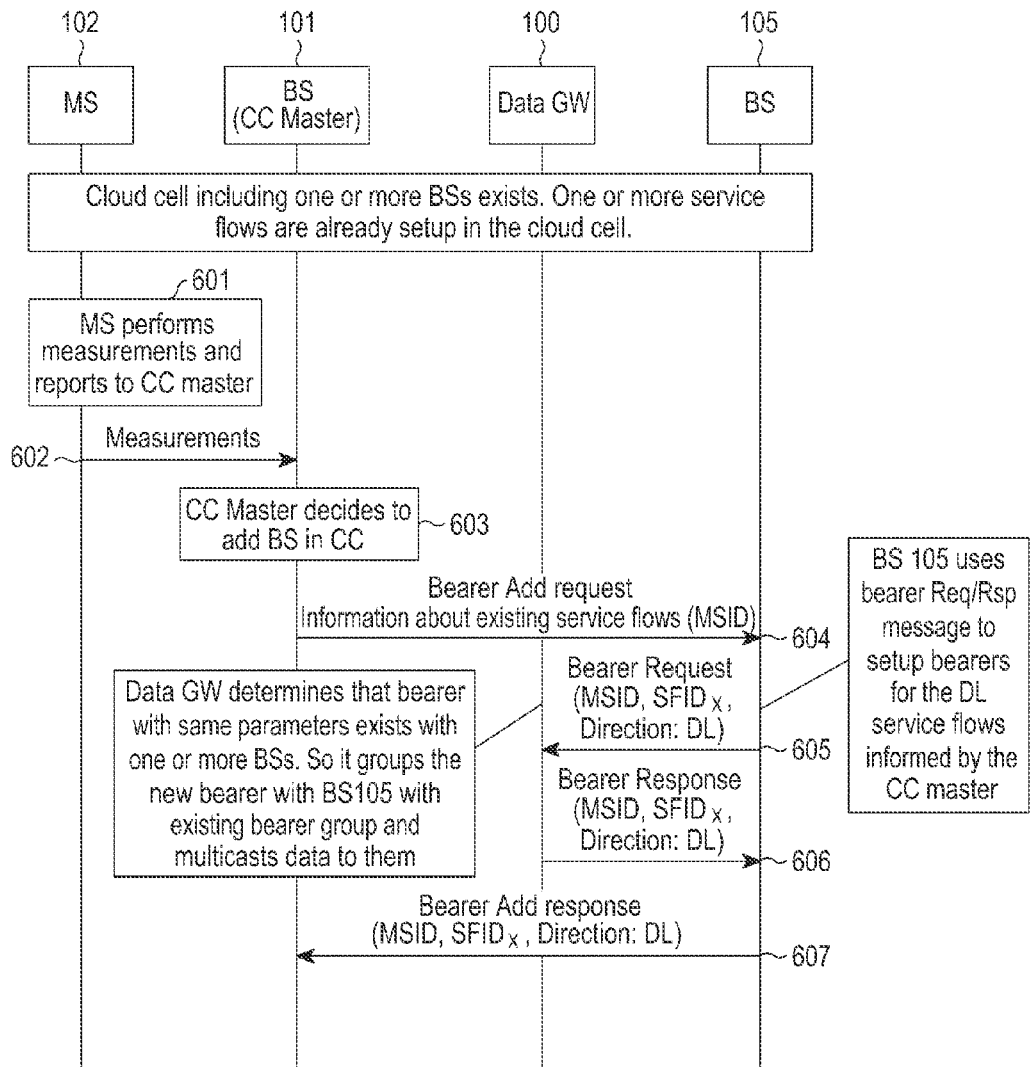
FIG. 6 illustrates a sequence diagram for grouping of downlink bearers across base stations when a base station is added in a Cloud Cell, according to an exemplary embodiment of the present disclosure.

FIG. 6 illustrates a sequence diagram for grouping of downlink bearers across base stations when a base station is added in the Cloud Cell, according to the embodiments as disclosed herein. This provides multicasting establishment without the data gateway 100 being aware of the Cloud Cell and Cloud Cell Master. In this scenario, the Cloud Cell that comprises one or more base stations is configured with one or more service flows.

At operation 601, the MS 102 performs measurements. These measurements by MS 102 comprise measuring of signal strength of a base station. At operation 602, the MS 102 reports these measurements to Cloud Cell Master 101. Depending on these measurements, the Cloud Cell Master 101 decides, at operation 603, to add a new base station in the Cloud Cell. Cloud Cell Master 101 may also decide to add a new base station in the Cloud Cell based on other factors (e.g., load balancing, geographical location of MS 102, etc.). At operation 604, the Cloud Cell Master sends a bearer add request to the new base station in the cloud, BS 105. This bearer add request includes information about the existing service flows and the MSID. At operation 605, the new base station BS 105 sends a bearer request to data gateway 100. This bearer request includes MSID, SFID$_X$, and the direction as downlink. At operation 606, the data gateway 101 sends a bearer response to BS 105. The new BS uses the bearer request messages to setup bearers for all the DL service flows informed by the Cloud Cell Master.

The data gateway 100 determines that a bearer with the same parameters exists with one or more BSs. So the data gateway 100 groups the new bearer of BS 105 with the existing bearer group and multicasts data to the bearers.

At operation 607, the new base station BS 105 sends bearer add response to the Cloud Cell Master 101. The bearer add response includes MSID, $SFID_X$, and the direction as DL. In this way a new base station will be added to a Cloud Cell and grouping of downlink bearers across base stations is achieved using the method described above.

Figure 7:
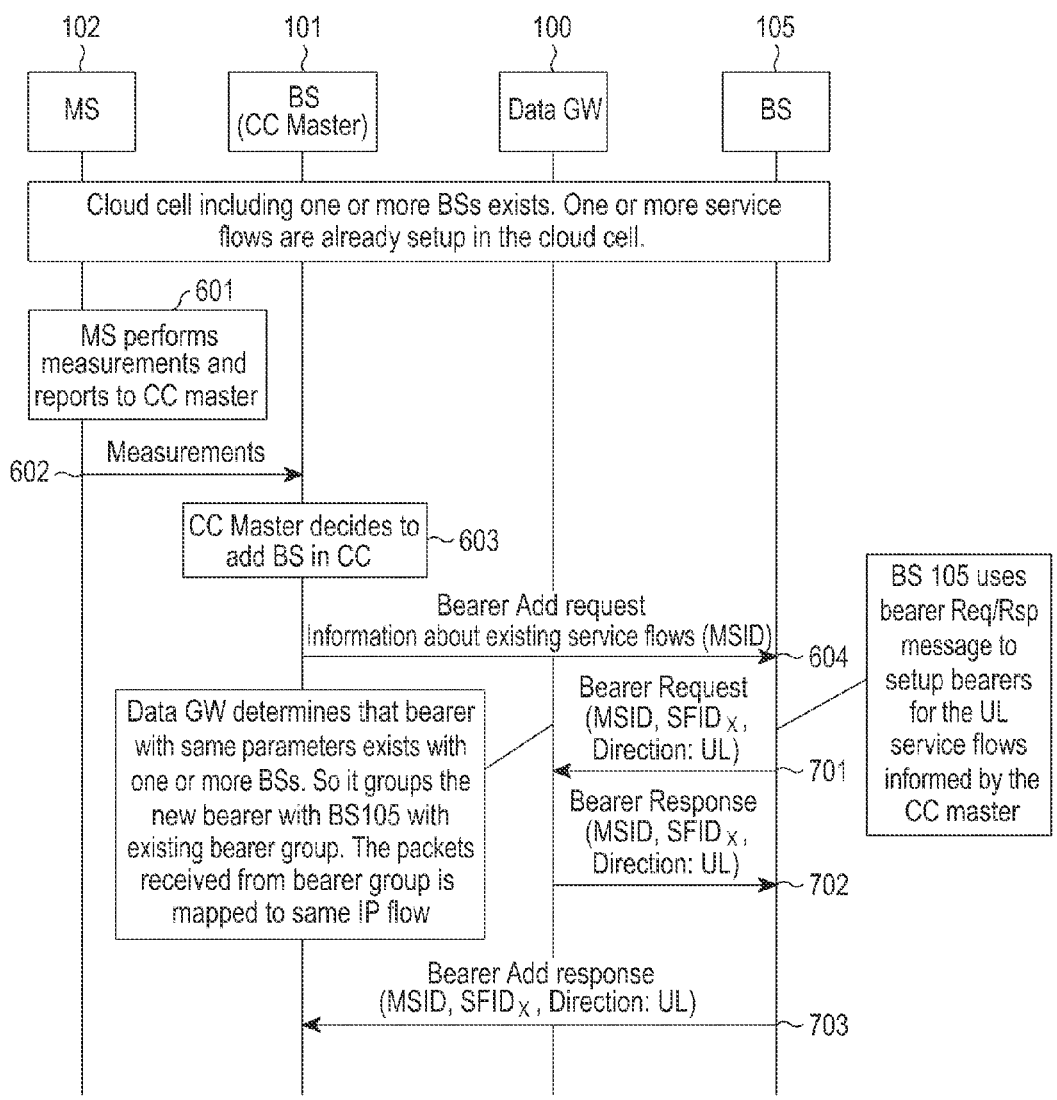
FIG. 7 illustrates a sequence diagram for grouping of uplink bearers across base stations when a base station is added in the Cloud Cell, according to an exemplary embodiment of the present disclosure.

FIG. 7 illustrates a sequence diagram for grouping of uplink bearers across base stations when a base station is added in the Cloud Cell, according to the embodiments as disclosed herein. In this scenario, the Cloud Cell that includes one or more base stations is configured with one or more service flows.

At operation 601, the MS 102 performs measurements. These measurements by MS 102 include measuring of signal strength. At operation 602, the MS 102 reports these measurements to Cloud Cell Master 101. Depending on these measurements, the Cloud Cell Master 101 decides, at operation 603, to add a new base station in the Cloud Cell. Cloud Cell Master 101 may also decide to add a new base station in the Cloud Cell based on other factors (e.g., load balancing, geographical location of MS 102, etc.). At operation 604, the Cloud Cell Master sends a bearer add request to the new base station in the Cloud Cell, BS 105. This bearer add request includes information about the existing service flows and the MSID. It is noted that operations 601-604 are the same as describe above with respect to FIG. 6. At operation 701, the new base station BS 105 sends a bearer request to data gateway 100. This bearer request includes MSID, $SFID_X$, and the direction as uplink. At operation 702, the data gateway 101 sends a bearer response to BS 105. The new BS 105 uses the bearer request messages to setup bearers for all the UL service flows informed by the Cloud Cell Master.

The data gateway 100 determines that a bearer with the same parameters exists with one or more BSs. The data gateway groups the new bearer for BS 105 with the existing bearer group. The packets received from the bearer group are mapped to the same IP flow.

At operation 703, the new base station BS 105 sends a bearer add response to the Cloud Cell Master 101. The bearer add response includes MSID, $SFID_X$, and the direction as UL. In this way a new base station will be added to a Cloud Cell and grouping of uplink bearers across base stations is achieved using the method described above.

Figure 8A:
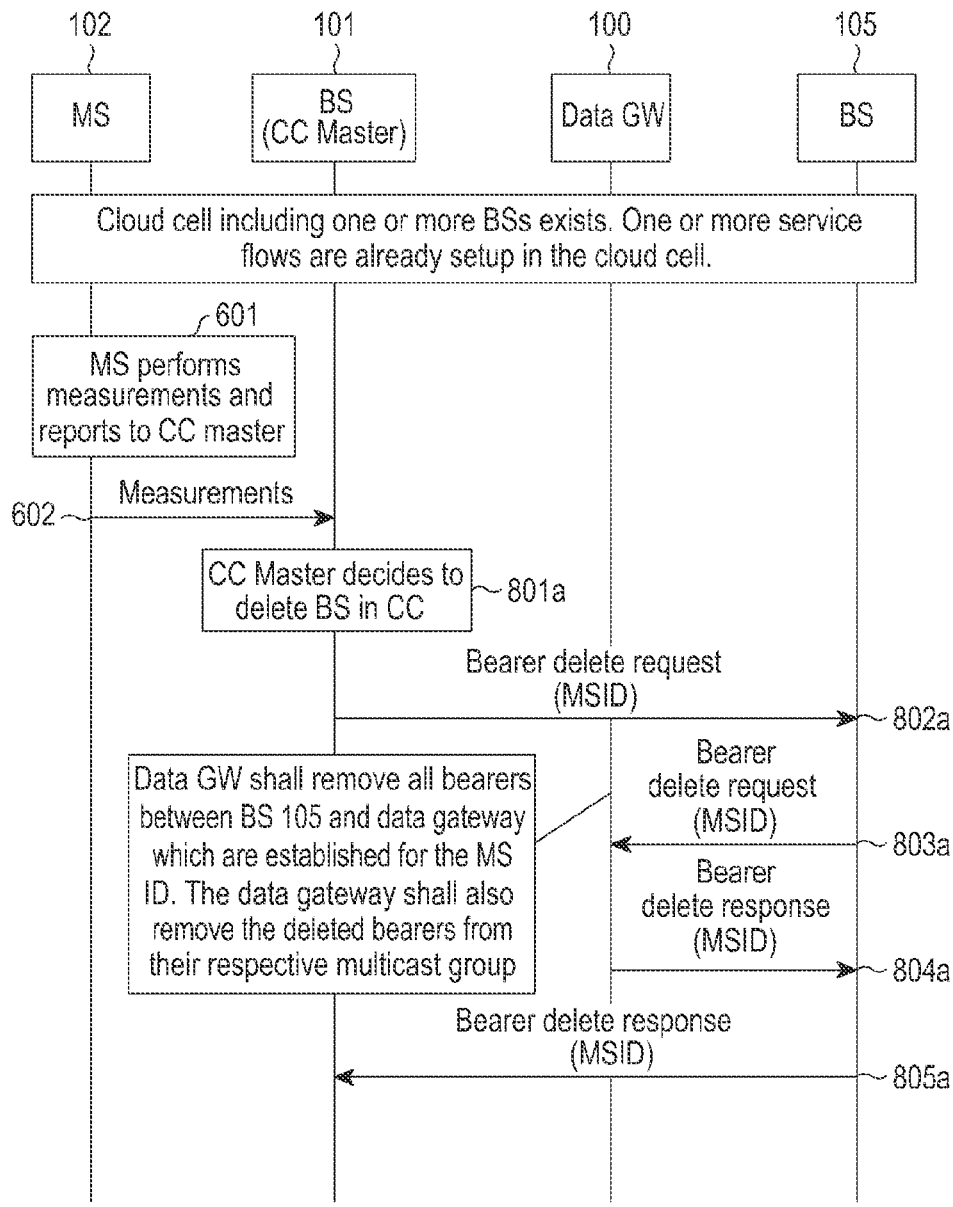
FIG. 8A illustrates a sequence diagram for association of bearers when a base station is deleted in the Cloud Cell, according to an exemplary embodiment of the present disclosure.

FIG. 8A illustrates a sequence diagram for association of bearers when a base station is deleted in the Cloud Cell, according to the embodiments as disclosed herein. In this scenario, the Cloud Cell that includes one or more base stations is configured with one or more service flows.

At operation 601, the MS 102 performs measurements. These measurements by MS 102 include measuring of signal strength from a base station. At operation 602, the MS 102 reports these measurements to Cloud Cell Master 101. It is noted that operations 601-602 are the same as described above with respect to FIG. 6. Depending on these measurements, the Cloud Cell Master 101 decides, at operation 801a, to delete a base station from the Cloud Cell. Cloud Cell Master 101 may also decide to delete a base station from the Cloud Cell based on other factors (e.g., load balancing, geographical location of the MS 102, etc.). At operation 802a, the Cloud Cell Master sends a bearer delete request to the base station BS 105 in the Cloud Cell. This bearer delete request includes the MSID. At operation 803a, the base station BS 105 sends a bearer delete request to data gateway 100. This bearer delete request includes MSID. At operation 804a, the data gateway 101 sends a bearer delete response to BS 105. This bearer delete response includes MSID.

The data gate way 100 removes all bearers between BS 105 and data gateway which are established for MSID. The data gateway 100 also removes the deleted bearers from their respective multicast group.

At operation 805a, the base station BS 105 sends bearer delete response to the Cloud Cell Master 101. This bearer delete response includes MSID. In this way a base station 105 will be deleted from a Cloud Cell and removal of all bearers between BS 105 and data gateway 100 is achieved using the method described above.

Figure 8B:
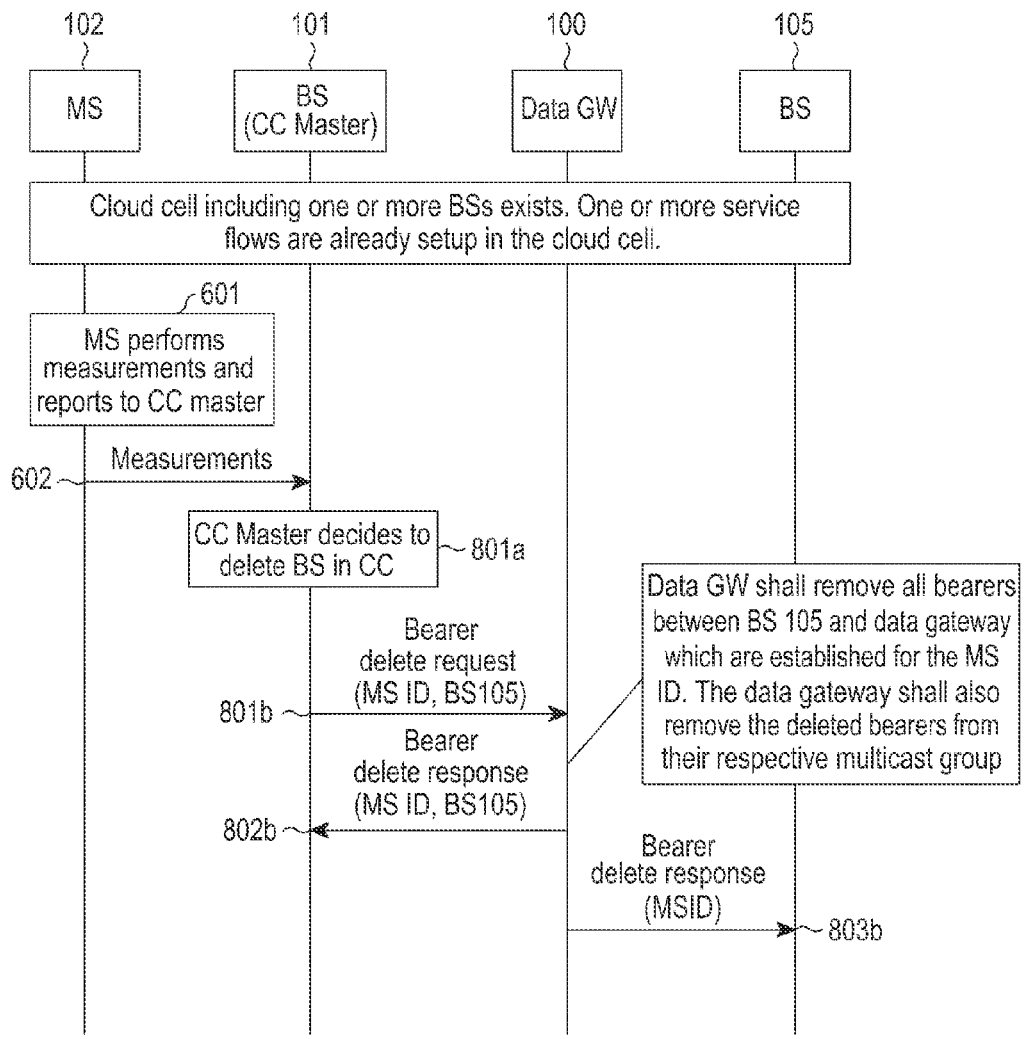
FIG. 8B illustrates a sequence diagram for association of bearers when a base station is deleted in the Cloud Cell, according to an exemplary embodiment of the present disclosure.

FIG. 8B illustrates a sequence diagram for association of bearers when a base station is deleted from the Cloud Cell, according to an alternate embodiment as disclosed herein. In this scenario, the Cloud Cell that includes one or more base stations is configured with one or more service flows.

At operation 601, the MS 102 performs measurements. These measurements by MS 102 include measuring of signal strength from a base station. At operation 602, the MS 102 reports these measurements to Cloud Cell Master 101. It is noted that operations 601-602 are the same as described above with respect to FIG. 6. Depending on these measurements, the Cloud Cell Master 101 decides, at operation 801a, to delete a base station from the Cloud Cell. Cloud Cell Master 101 may also decide to delete a base station from the Cloud Cell based on other factors (e.g., load balancing, geographical location of the MS 102, etc.). At operation 801b, the Cloud Cell Master 101 sends a bearer delete request to the data gateway 101. This bearer delete request includes the MSID and BS 105. At operation 802b, the data gateway 100 sends a bearer delete response to Cloud Cell Master 101.

The data gateway 100 removes all bearers between BS 105 and data gateway 100 which are established for MSID. The data gateway also removes the deleted bearers from their respective multicast group. At operation 803b, the data gateway 101 sends a bearer delete response with MSID to BS 105.

Figure 9A:
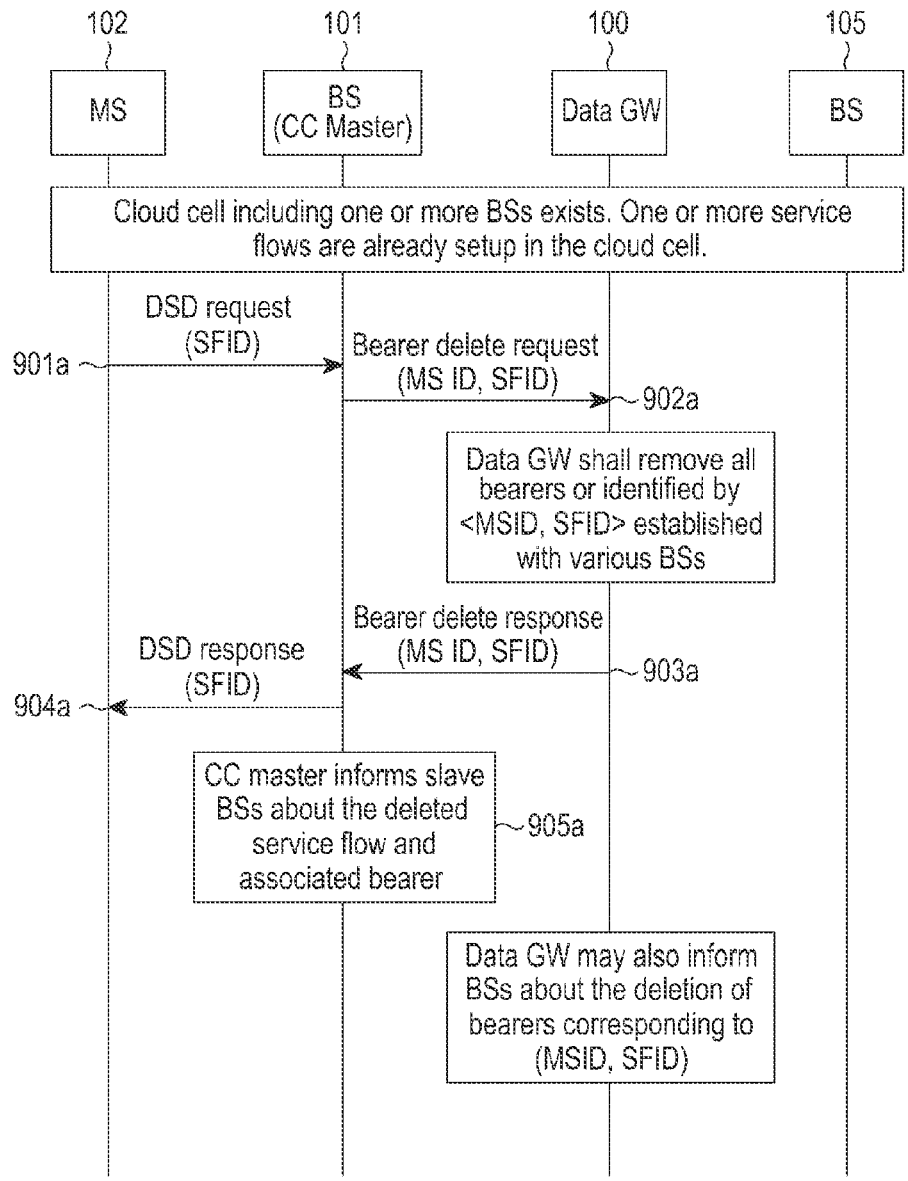
FIG. 9A illustrates a sequence diagram for association of bearers when a service flow is deleted in the Cloud Cell, according to an exemplary embodiment of the present disclosure.

FIG. 9A illustrates a sequence diagram for association of bearers when a service flow is deleted in the Cloud Cell, according to the embodiments as disclosed herein. In this scenario, the Cloud Cell that includes one or more base stations is configured with one or more service flows.

At operation 901a, the mobile station MS 102 sends a Dynamic Service Delete (DSD) request to Cloud Cell Master 101. The DSD request includes SFID, which is used to identify the service. At operation 902a, the Cloud Cell Master 101 sends a bearer delete request to the data gateway 100. The bearer delete request includes MSID and SFID.

The data gateway 100 removes all bearers that are identified by using MSID, SFID established with various BSs. At operation 903a, the data gateway 100 sends a bearer delete response to the Cloud Cell Master 101. This bearer delete response includes MSID and SFID. At operation 904a, the Cloud Cell Master 101 sends DSD response with SFID to MS 102.

At operation 905a, the Cloud Cell Master 101 also informs all the slave base stations in the Cloud Cell about the deleted service flow and associated bearers.

In an embodiment, data gateway 100 also informs the BSs about the deletion of bearers corresponding to the MSID and SFID.

Figure 9B:
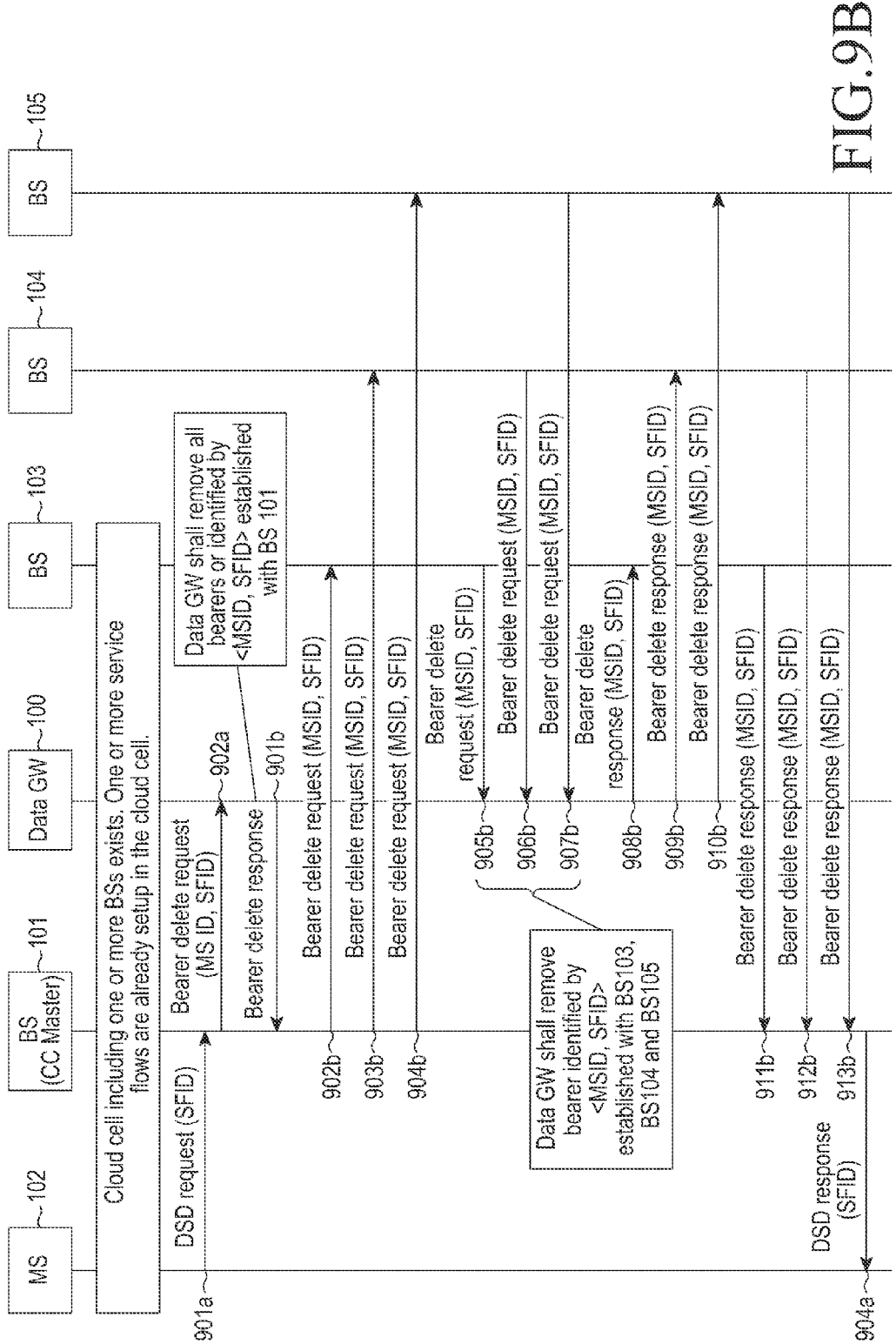
FIG. 9B illustrates a sequence diagram for association of bearers when a service flow is deleted in the Cloud Cell, according to an exemplary embodiment of the present disclosure.

FIG. 9B illustrates a sequence diagram for association of bearers when a service flow is deleted in the Cloud Cell, according to an alternate embodiment as disclosed herein. In this scenario, the Cloud Cell that includes one or more base stations is configured with one or more service flows.

At operation 901a, the mobile station 102 sends a DSD request to the Cloud Cell Master 101. This DSD request includes SFID, which is unique for a particular service. At operation 902a, the Cloud Cell Master sends a bearer delete request to the data gateway 100. The bearer delete request includes MSID and SFID. It is noted that operations 901a-902a are the same as described above with respect to FIG. 9A.

The data gateway 100 removes all bearers that are identified by using MSID, SFID established with Cloud Cell Master (or base station) 101. At operation 901b, the data gateway 100 sends a bearer delete response to the Cloud Cell Master 101.

The Cloud Cell Master 101 sends bearer delete requests individually to all the base stations, namely, BS 103, BS 104, and BS 105, within the Cloud Cell. At operation 902b, the Cloud Cell Master 101 sends bearer delete request to BS 103. At operation 903b, the Cloud Cell Master 101 sends bearer delete request to BS 104. At operation 904b, the Cloud Cell Master 101 sends bearer delete request to BS 105. These bearer delete requests from Cloud Cell Master 101 to all BSs comprises MSID and SFID. Operations 902b-904b occur concurrently, but are depicted separately in FIG. 9B for visual clarity.

Upon receiving the bearer delete request from the Cloud Cell Master 101, at operation 905b, the BS 103 sends bearer delete request to the data gateway 100. Similarly, at operation 906b, BS 104 sends the bearer delete request to the data gateway 100. At operation 907b, the BS 105 also sends the bearer delete request to the data gateway 100. These bearer delete requests from the base stations BS 103, BS 104, and BS 105 to data gateway 100 include MSID and SFID. Operations 905b-907b occur concurrently, but are depicted separately in FIG. 9B for visual clarity.

Further, in response to bearer delete requests from all BSs, the data gateway 100 sends individual bearer delete responses to all the base stations, namely, BS 103, BS 104, and BS 105.

At operation 908b, the data gateway sends bearer delete response to BS 103. Further, at operation 909b, the data gateway 100 sends a bearer delete response to BS 104. At operation 910b, the data gateway 100 also sends a bearer delete response to BS 105. Operations 908b-910b occur concurrently, but are depicted separately in FIG. 9B for visual clarity.

The base stations also inform the Cloud Cell Master 100 about their bearer deletions by the data gateway 100. At operation 911b, the BS 103 sends bearer delete response to Cloud Cell Master 101. At operation 9112b, the BS 104 sends bearer delete response to Cloud Cell Master 101. At operation 913b, the BS 105 sends bearer delete response to Cloud Cell Master 101. Operations 911b-913b occur concurrently, but are depicted separately in FIG. 9B for visual clarity. At operation 904a, the Cloud Cell Master 101 sends the DSD response to the mobile station (MS) 102. It is noted that operation 904a is the same as described above with respect to FIG. 9A. In an embodiment, the interaction between Cloud Cell Master 101, slave BSs, and data gateway 100 as illustrated in FIGS. 9a and 9b is also valid for the case wherein service flow deletion is initiated by a BS instead of by MS 102.

Figure 10:
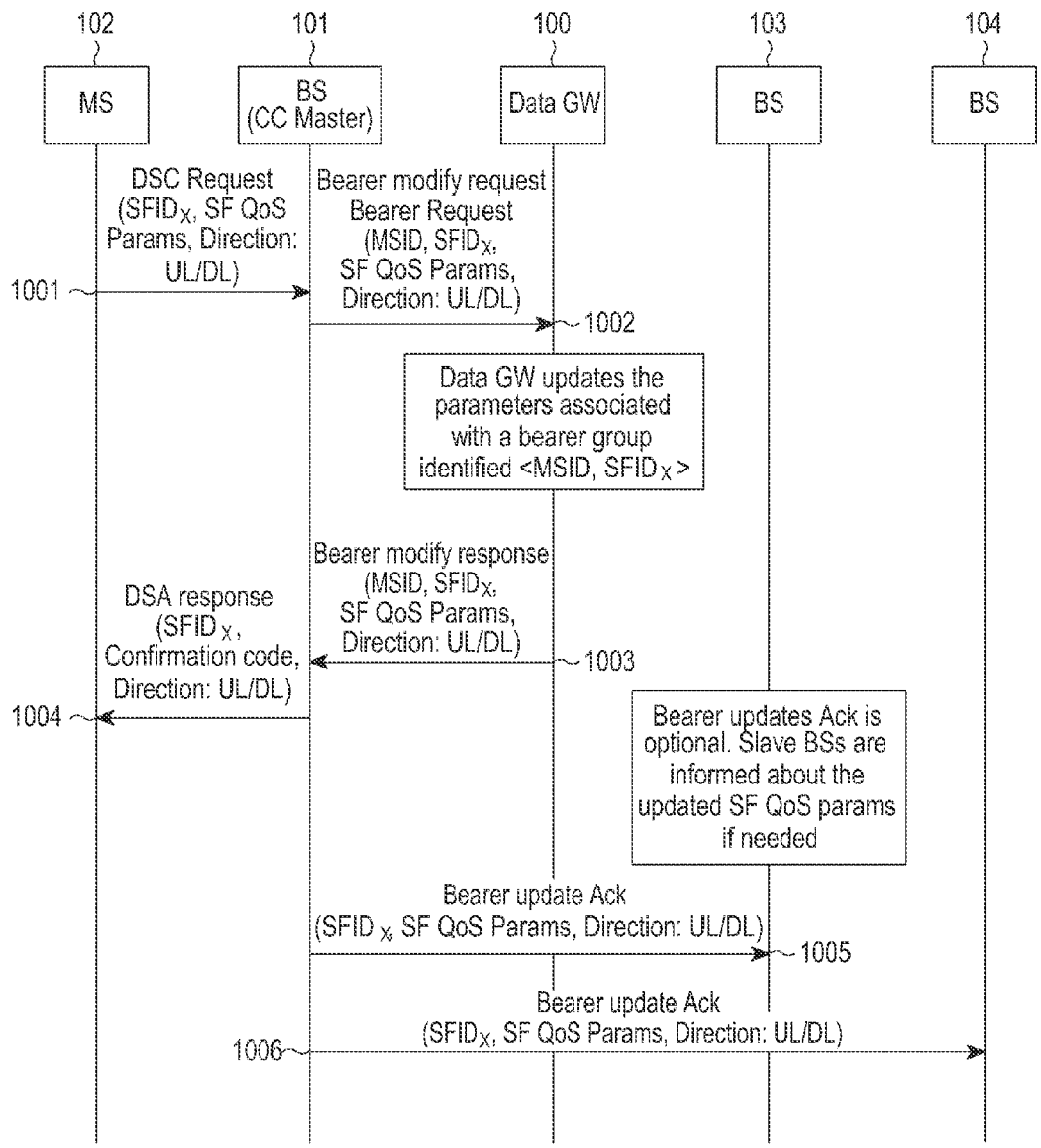
FIG. 10 illustrates a sequence diagram for service flow parameter change, according to an exemplary embodiment of the present disclosure.

FIG. 10 illustrates a sequence diagram for service flow parameter change, according to the embodiments as disclosed herein. At operation 1001, the MS 102 initially sends a Data Source Control (DSC) request to Cloud Cell Master 101. This DSC request includes $SFID_x$, SF QoS, and direction which may be either uplink or downlink. At operation 1002, the Cloud Cell Master 101 sends a bearer modify request to the data gateway 100. The bearer modify request includes MSID, $SFID_x$, SF QoS parameters, and the direction, which can be either uplink or downlink.

The data gateway 100 updates the parameters associated with a bearer group identified by MSID and $SFID_x$. At operation 1003, the data gateway 100 sends bearer modify response to the Cloud Cell Master 101.

At operation 1004, the Cloud Cell Master 101 sends DSC response to MS 102. This DSC response includes $SFID_x$, confirmation code, and the direction, which may be either an uplink or a downlink. At operation 1005, the Cloud Cell Master 101 sends bearer update acknowledgement (Ack) to BS 103. The bearer update acknowledgement includes MSID, $SFID_x$, SF QoS parameters, and the direction which may be either uplink or downlink. At operation 1006, the Cloud Cell Master also sends bearer update acknowledgement (Ack) to BS 104.

In an embodiment, the bearer update Ack is optional. The slave base stations, namely, BS 103 and BS 104, in the Cloud Cell are informed about the updated QoS parameters if needed.

Figure 11:
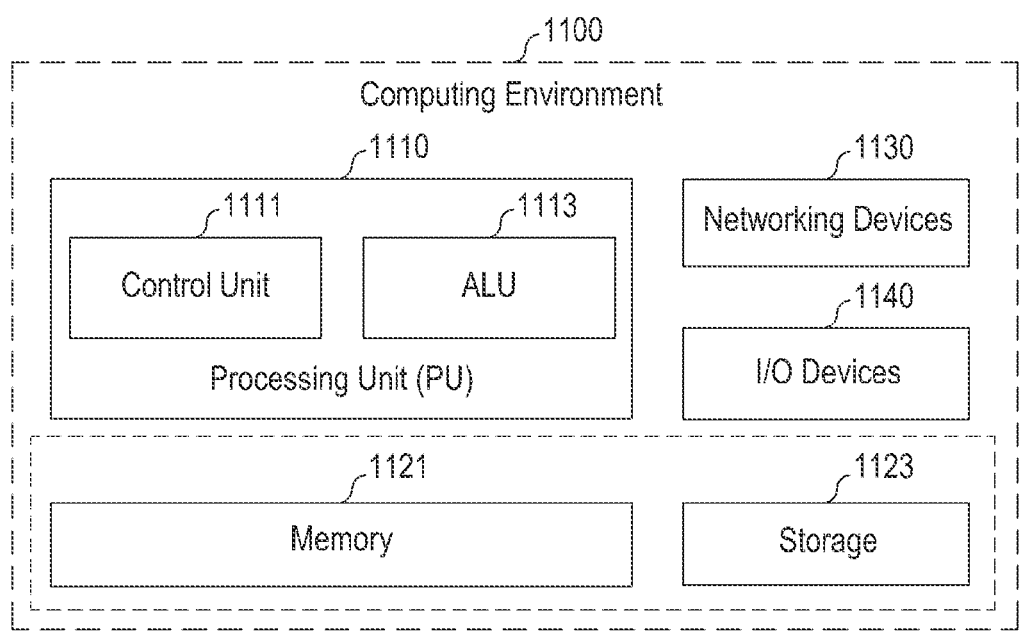
FIG. 11 illustrates a computing environment implementing the present disclosure, according to an exemplary embodiment of the present disclosure.

FIG. 11 illustrates a computing environment 1100 implementing the present disclosure as disclosed in the embodiments herein. As depicted in FIG. 11, the computing environment 1100 includes at least one Processing Unit (PU) 1110 including a control unit 1111 and an Arithmetic Logic Unit (ALU) 1113, a memory 1121, storage 1123, one or more networking devices 1130, and one or more Input/Output (I/O) devices 1140. The processing unit 1110 is responsible for processing the instructions of the algorithm. The processing unit 1110 receives commands from the control unit 1111 in order to perform its processing. Further, any logical and arithmetic operations involved in the execution of the instructions are computed with the help of the ALU 1113.

The overall computing environment 1100 is adapted for the implementation and can be composed of multiple homogeneous and/or heterogeneous cores, multiple Central Processing Units (CPUs) of different kinds, special media, and other accelerators. The processing unit 1110 is responsible for processing the instructions of the algorithm. The processing unit 1110 receives commands from the control unit 1111 in order to perform its processing. Further, any logical and arithmetic operations involved in the execution of the instructions are computed with the help of the ALU 1113. Further, the plurality of processing units may be located on a single chip or distributed over multiple chips.

The algorithm including instructions and codes used for the implementation are stored in either the memory unit 1121 or the storage 1123 or both. At the time of execution, the instructions may be fetched from the corresponding memory 1121 and/or storage 1123, and executed by the processing unit 1110.

In case of any hardware implementations various networking devices or external I/O devices may be connected to the computing environment 1100 to support the implementation through the networking devices 1130 and the I/O devices 1140.

The embodiments disclosed herein can be implemented through at least one computer readable storage medium encoded with a software program configured for running on at least one hardware device and performing network management functions to control the elements. The elements shown in FIGS. 1 through 11 include blocks which can be embodied in at least one of a hardware device and a combination of hardware device and software.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for communicating, by a first base station (BS), in a wireless communication network, the method comprising:
   transmitting a radio bear (RB) request comprising a first parameter to a data gateway (GW), the first parameter comprising a quality of service (QoS) of a service flow (SF) which is to be provided to a mobile station (MS) and a MS identification (ID) (MSID) of the MS;
   receiving an RB response comprising a second parameter from the data GW if a first RB between the first BS and the data GW is established based on the first parameter, the second parameter comprising an SF identification (ID) (SFID) number and the MSID; and
   transmitting an RB add request comprising the second parameter to one or more second BSs,
   wherein the second parameter is used to establish an RB group by the data GW, the RB group comprising the first RB and one or more second RBs, the one or more second RBs are established between the data GW and the one or more second BSs.

2. The method of claim 1, wherein downlink/uplink (DL/UL) data for the MS is transmitted on the RBs in the RB group based on the SFID number, MSID, and ID of a BS.

3. The method of claim 1, wherein the first parameter and the second parameter further comprise a direction of the SF.

4. The method of claim 1, wherein the first BS comprises a main BS and the one or more second BSs comprises a cooperative BS in a cooperative cell.

5. The method of claim 1, further comprising:
   transmitting an RB add request comprising a third parameter to a third BS different from the one or more second BSs, the third parameter comprising information about the SF and the MSID,
   wherein a third RB between the third BS and the data GW is established, and
   wherein the third RB is added to the RB group.

6. The method of claim 1, further comprising transmitting an RB delete request comprising the MSID to at least one second BS.

7. The method of claim 1, further comprising transmitting an RB delete request comprising the MSID and at least one ID of the one or more second BSs to the data GW.

8. A method for communicating, by a data gateway (GW), in a wireless communication network, the method comprising:
   receiving a radio bear (RB) request comprising a first parameter from a first base station (BS), the first parameter comprising a quality of service (QoS) of a service flow (SF) which is to be provided to a mobile station (MS) and a MS identification (ID) (MSID) of the MS;
   establishing a first RB between the first BS and the data GW based on the first parameter;
   transmitting an RB response comprising a second parameter to the first BS, the second parameter comprising an SF identification (ID) (SFID) number and the MSID;
   receiving an RB add request comprising the second parameter from one or more second BSs;
   establishing one or more second RBs between the data GW and the one or more second BSs; and
   establishing an RB group comprising the first RB and the one or more second RBs based on the second parameter.

9. The method of claim 8, wherein downlink/uplink (DL/UL) data for the MS is transmitted on the RBs in the RB group based on the SFID number, MSID, and ID of a BS.

10. The method of claim 8, wherein the first parameter and the second parameter further comprise a direction of the SF.

11. The method of claim 8, wherein the first BS comprises a main BS and the one or more second BSs comprises a cooperative BS in a cooperative cell.

12. The method of claim 8, further comprising:
    receiving an RB add request comprising the SFID and the MSID from a third BS different from the one or more second BSs;
    establishing a third RB between the third BS and the data GW; and
    adding the third RB to the RB group.

13. The method of claim 8, further comprising:
    receiving an RB delete request comprising the MSID from at least one second BS; and
    deleting at least one RB between the data GW and the at least one second BS.

14. The method of claim 8, further comprising:
    receiving an RB delete request comprising the MSID and at least one ID of the one or more second BSs from the first BS; and
    deleting at least one RB between the data GW and the one or more second BSs.

15. A first base station (BS) for communicating in a wireless communication network, the first BS comprising:
    a transmitter configured to transmit a radio bear (RB) request comprising a first parameter to a data gateway (GW), the first parameter comprising a quality of service (QoS) of a service flow (SF) which is to be provided to a mobile station (MS) and a MS identification (ID) (MSID) of the MS;
    a receiver configured to receive an RB response comprising a second parameter from the data GW if a first RB between the first BS and the data GW is established based on the first parameter, the second parameter comprising an SF identification (ID) (SFID) number and the MSID; and
    the transmitter configured to transmit an RB add request comprising the second parameter to one or more second BSs,
    wherein the second parameter is used to establish an RB group by the data GW, the RB group comprising the first RB and one or more second RBs, the one or more second RBs are established between the data GW and the one or more second BSs.

16. The first BS of claim 15, wherein downlink/uplink (DL/UL) data for the MS is transmitted on the RBs in the RB group based on the SFID number, MSID, and ID of a BS.

17. The first BS of claim 15, wherein the first parameter and the second parameter further comprise a direction of the SF.

18. The first BS of claim 15, wherein the first BS comprises a main BS and the one or more second BSs comprises a cooperative BS in a cooperative cell.

19. The first BS of claim 15,
    wherein the transmitter is further configured to transmit an RB add request comprising a third parameter to a third BS different from the one or more second BSs, the third parameter comprising information about the SF and the MSID, wherein a third RB between the third BS and the data GW is established, and wherein the third RB is added to the RB group.

20. The first BS of claim 15, wherein the transmitter is further configured to transmit an RB delete request comprising the MSID to at least one second BS.

21. The first BS of claim 15, wherein the transmitter is further configured to transmit an RB delete request comprising the MSID and at least one ID of the one or more second BSs to the data GW.

22. A data gateway (GW) for communicating in a wireless communication network, the data GW comprising:
- a receiver configured to receive a radio bear (RB) request comprising a first parameter from a first base station (BS), the first parameter comprising a quality of service (QoS) of a service flow (SF) which is to be provided to a mobile station (MS) and an MS identification (ID) (MSID) of the MS;
- a controller configured to establish a first RB between the first BS and the data GW based on the first parameter; and
- a transmitter configured to transmit an RB response comprising a second parameter to the first BS, the second parameter comprising an SF identification (ID) (SFID) number and the MSID,
- wherein the receiver is further configured to receive an RB add request comprising the second parameter from one or more second BSs, and
- wherein the controller is further configured to:
  - establish one or more second RBs between the data GW and the one or more second BSs, and
  - establish an RB group comprising the first RB and the one or more second RBs based on the second parameter.

23. The data GW of claim 22, wherein downlink/uplink (DL/UL) data for the MS is transmitted on the RBs in the RB group based on the SFID number, MSID, and ID of a BS.

24. The data GW of claim 22, wherein the first parameter and the second parameter further comprise a direction of the SF.

25. The data GW of claim 22, wherein the first BS comprises a main BS and the one or more second BSs comprises a cooperative BS in a cooperative cell.

26. The data GW of claim 22,
wherein the receiver is further configured to receive an RB add request comprising the SFID and the MSID from a third BS different from the one or more second BSs, and
wherein the controller is further configured to:
establish a third RB between the third BS and the data GW, and
add the third RB to the RB group.

27. The data GW of claim 22,
wherein the receiver is further configured to receive an RB delete request comprising the MSID from at least one second BS, and
wherein the controller is further configured to delete at least one RB between the data GW and the at least one second BS.

28. The data GW of claim 22,
wherein the receiver is further configured to receive an RB delete request comprising the MSID and at least one ID of the one or more second BSs from the first BS, and
wherein the controller is further configured to delete at least one RB between the data GW and the one or more second BSs.

* * * * *